(12) United States Patent
Takita

(10) Patent No.: US 9,784,456 B2
(45) Date of Patent: Oct. 10, 2017

(54) ELECTRIC STOVE

(75) Inventor: Masaaki Takita, Osaka (JP)

(73) Assignee: TAKITA RESEARCH & DEVELOPMENT CO., LTD., Osaka (JP)

( * ) Notice: Subject to any disclaimer, the term of this patent is extended or adjusted under 35 U.S.C. 154(b) by 799 days.

(21) Appl. No.: 13/978,069

(22) PCT Filed: Feb. 7, 2011

(86) PCT No.: PCT/JP2011/052539
§ 371 (c)(1),
(2), (4) Date: Jul. 2, 2013

(87) PCT Pub. No.: WO2012/107992
PCT Pub. Date: Aug. 16, 2012

(65) Prior Publication Data
US 2013/0299486 A1    Nov. 14, 2013

(51) Int. Cl.
*A21B 1/00* (2006.01)
*F24C 7/06* (2006.01)
*A47J 37/07* (2006.01)
*F24C 15/22* (2006.01)

(52) U.S. Cl.
CPC ........... *F24C 7/065* (2013.01); *A47J 37/0709* (2013.01); *F24C 15/22* (2013.01)

(58) Field of Classification Search
CPC ........ B61G 5/06; A47J 37/0709; F24C 15/22; F24C 7/065
USPC ......... 219/200, 385, 391, 399, 443.1, 451.1, 219/455.12, 460.1–464.1; 392/421
See application file for complete search history.

(56) References Cited

U.S. PATENT DOCUMENTS

| | | |
|---|---|---|
| 2004/0163550 A1 | 8/2004 | Han et al. |
| 2008/0314891 A1* | 12/2008 | Takita ................. A47J 37/0635 219/385 |

FOREIGN PATENT DOCUMENTS

| | | |
|---|---|---|
| JP | 2002-340345 A | 11/2002 |
| JP | 2003-130367 A | 5/2003 |
| JP | 2004-305706 A | 11/2004 |
| JP | 4156023 B1 | 9/2008 |
| WO | WO2008126170 | * 10/2008 |

* cited by examiner

*Primary Examiner* — Dana Ross
*Assistant Examiner* — Joseph Iskra
(74) *Attorney, Agent, or Firm* — Rabin & Berdo, P.C.

(57) ABSTRACT

An electric stove includes an electric heating element arranged at a distance from a position right below a target to be heated. A first mirror surface portion is arranged to surround the electric heating element and configured to reflect heat rays radiated from the electric heating elements. A second mirror surface portion is arranged below the electric heating elements and configured to collect the heat rays reflected by the first mirror surface portion to a side below the target by reflecting the heat rays substantially immediately upwardly. The first mirror surface portion includes a plurality of partial elliptical mirror surface portions having one focus near the electric heating elements and the other focus below the electric heating elements, and the second mirror surface portion includes a partial elliptical mirror surface portion a having one focus near the electric heating elements and the other focus below the electric heating elements.

5 Claims, 25 Drawing Sheets

[Fig.1]
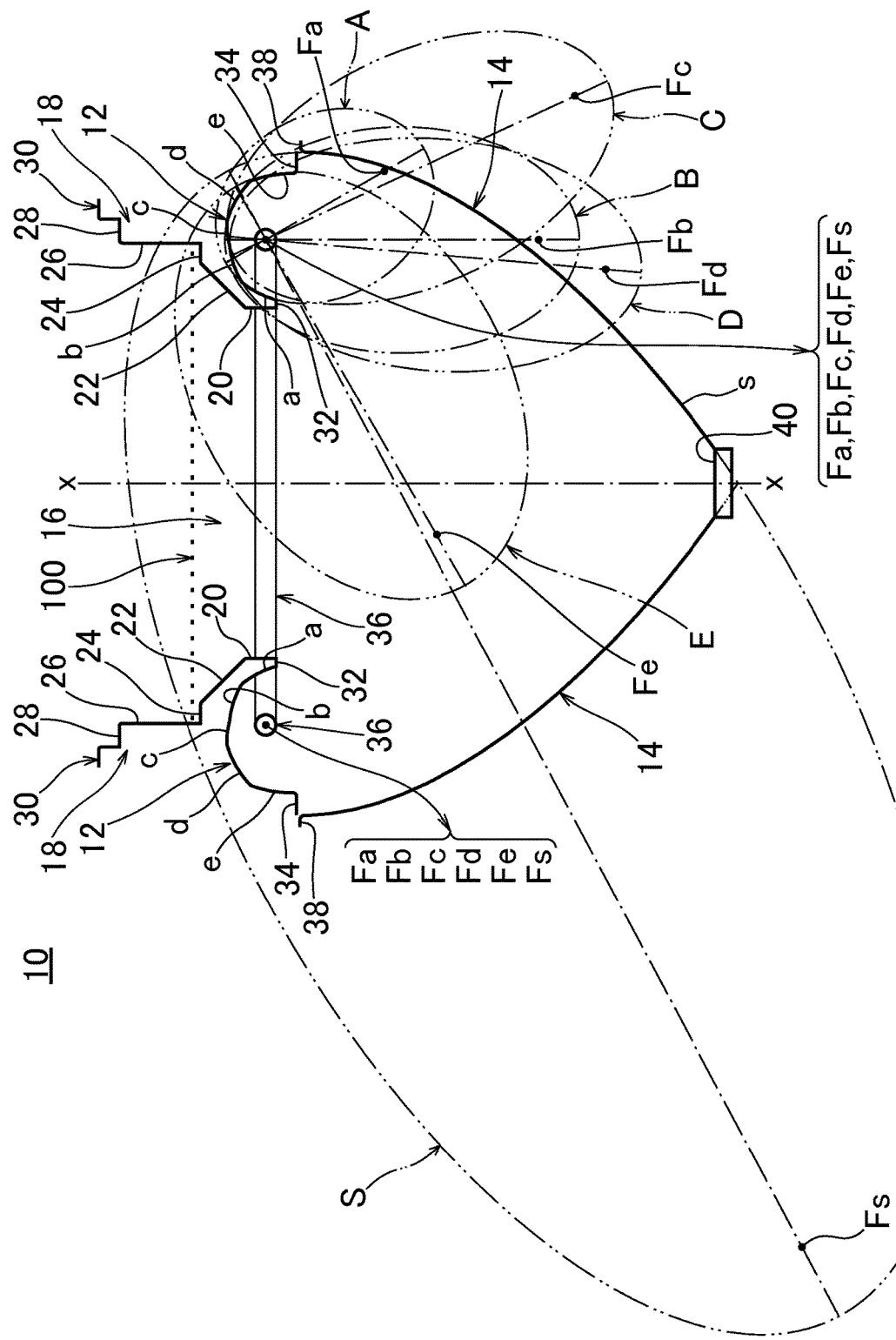

[Fig.2]
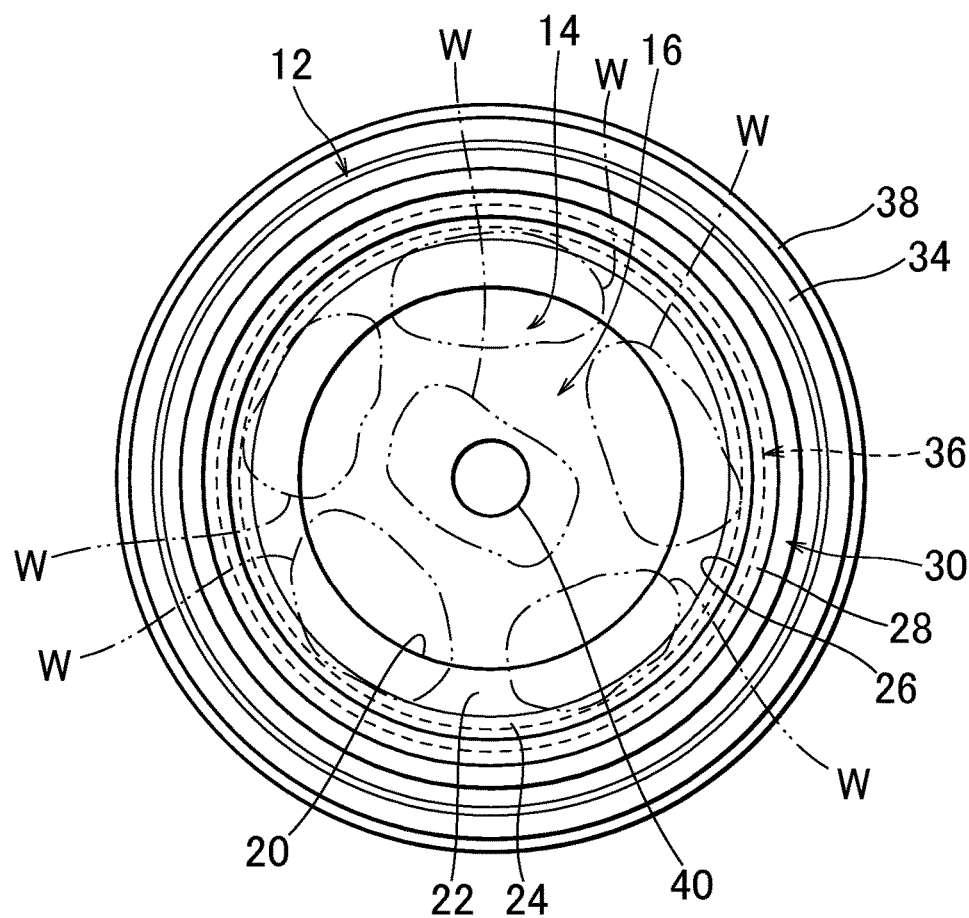

[Fig.3]
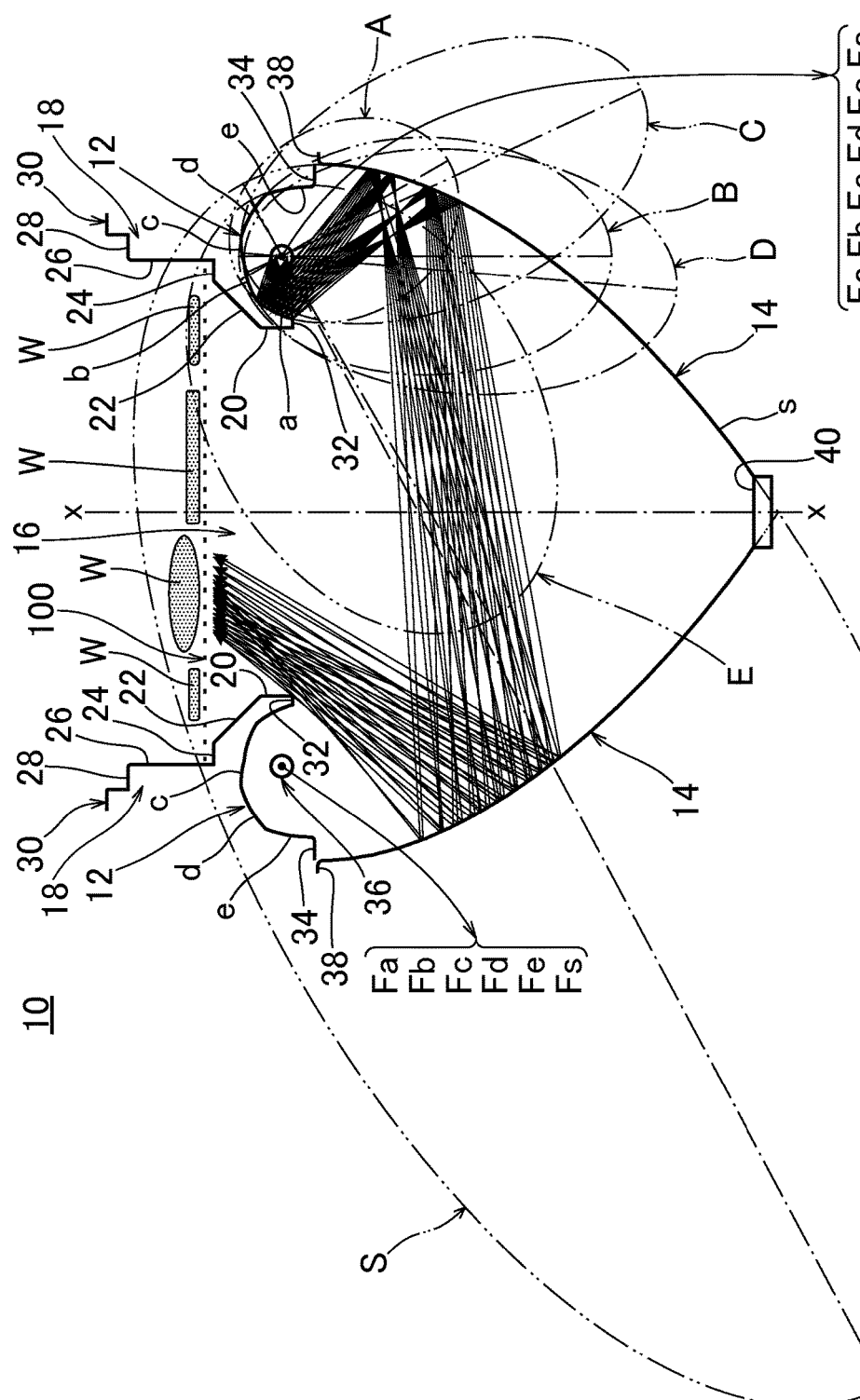

[Fig.4]
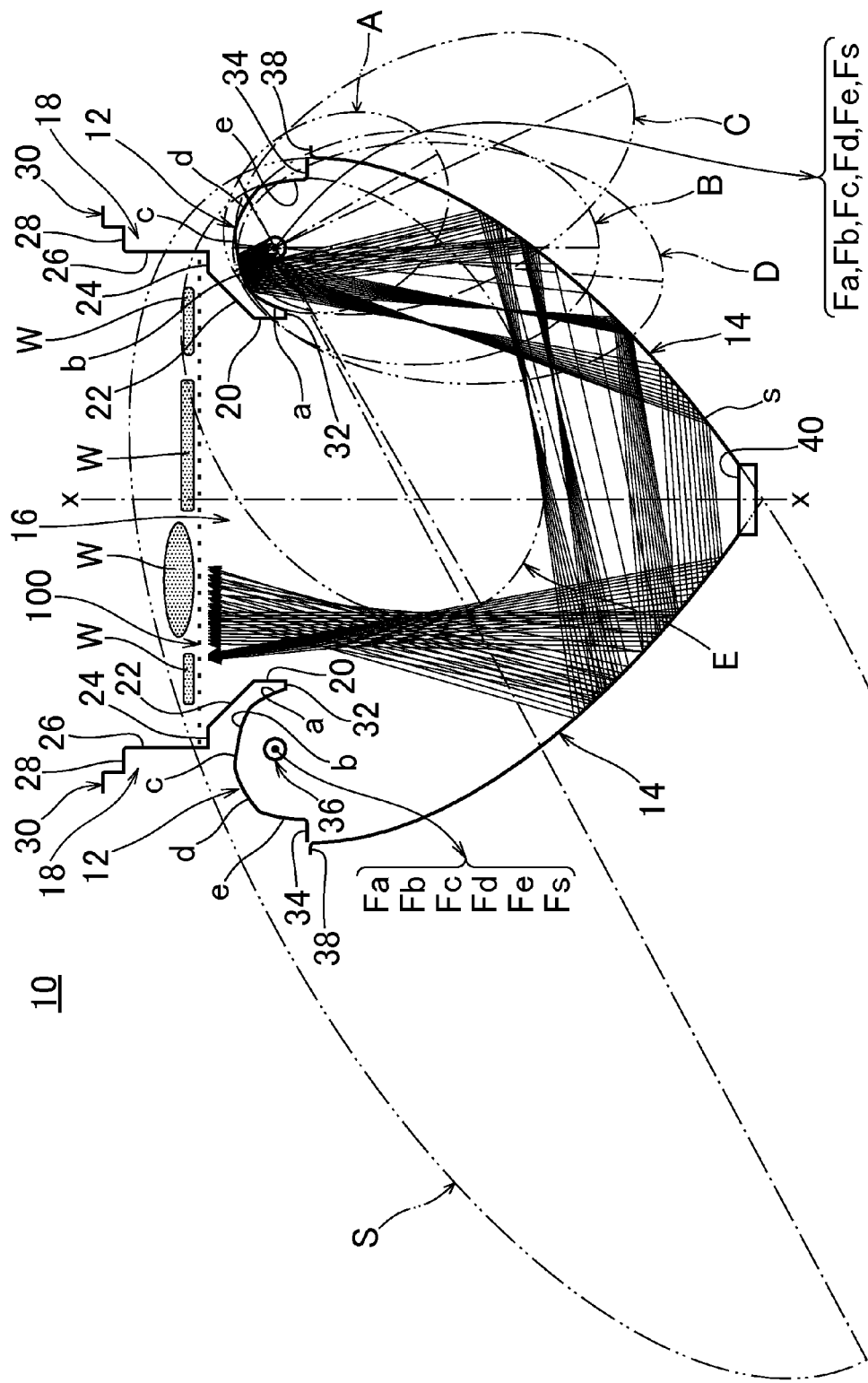

[Fig.5]
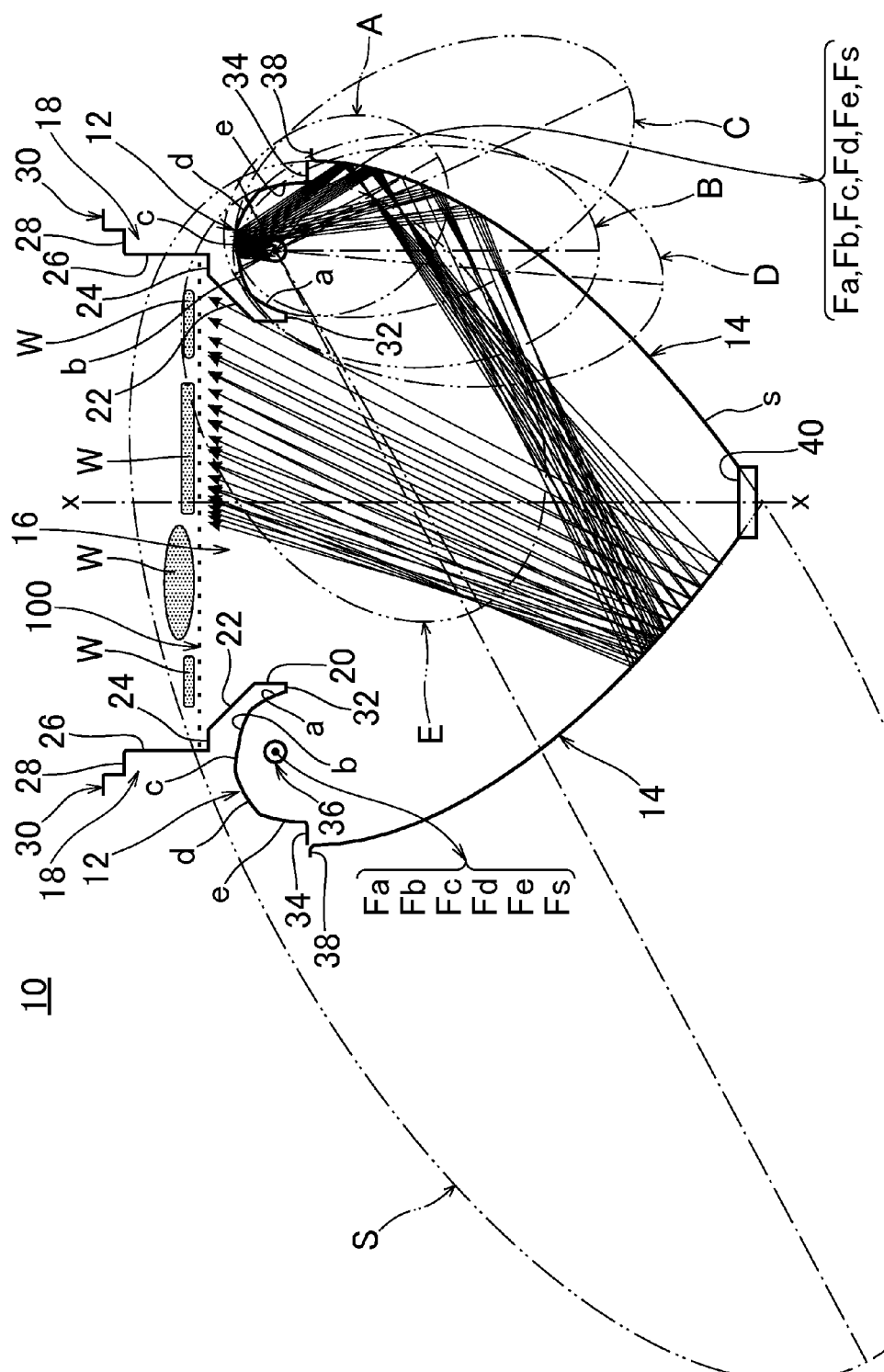

[Fig.6]
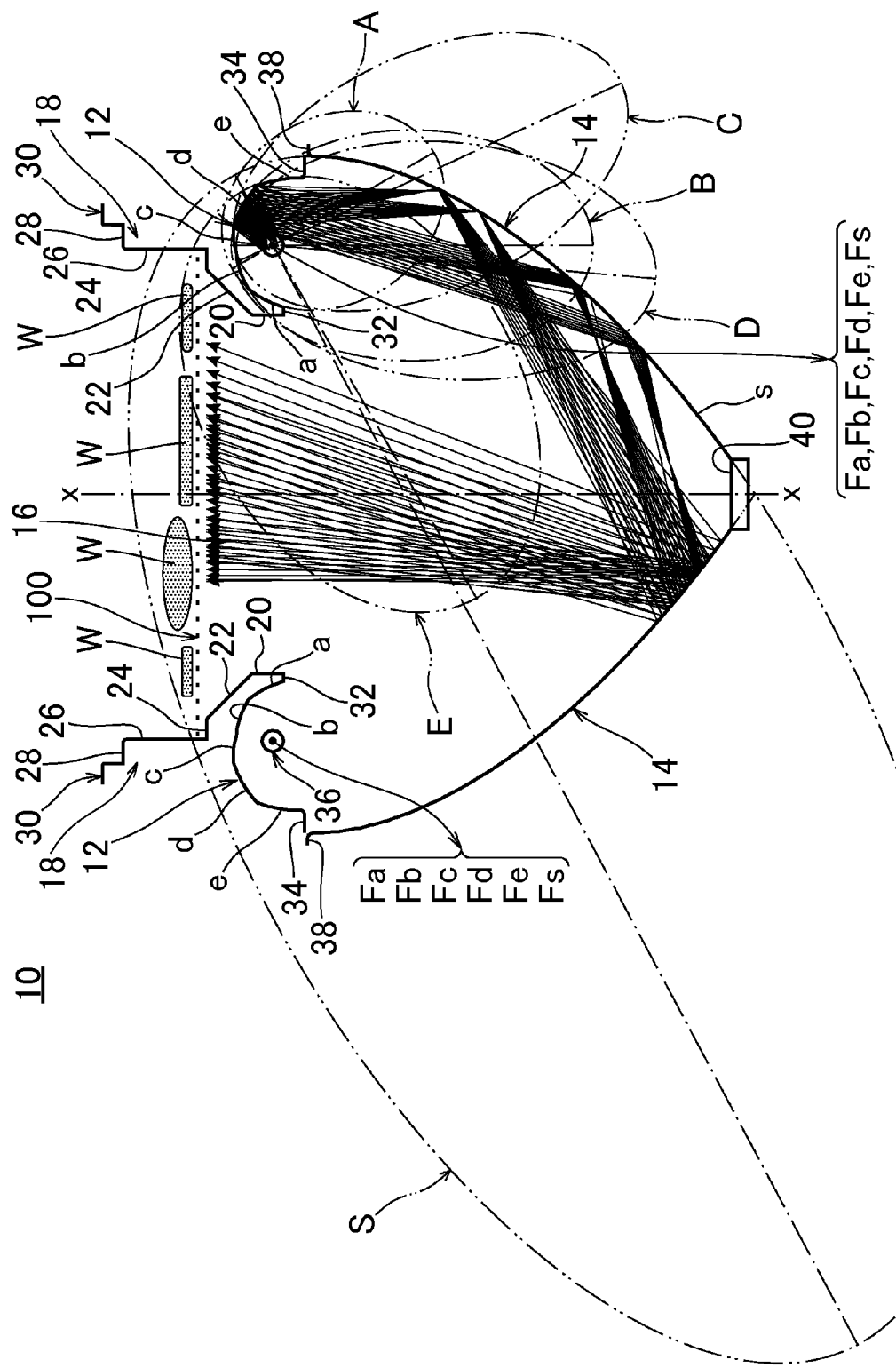

[Fig.7]
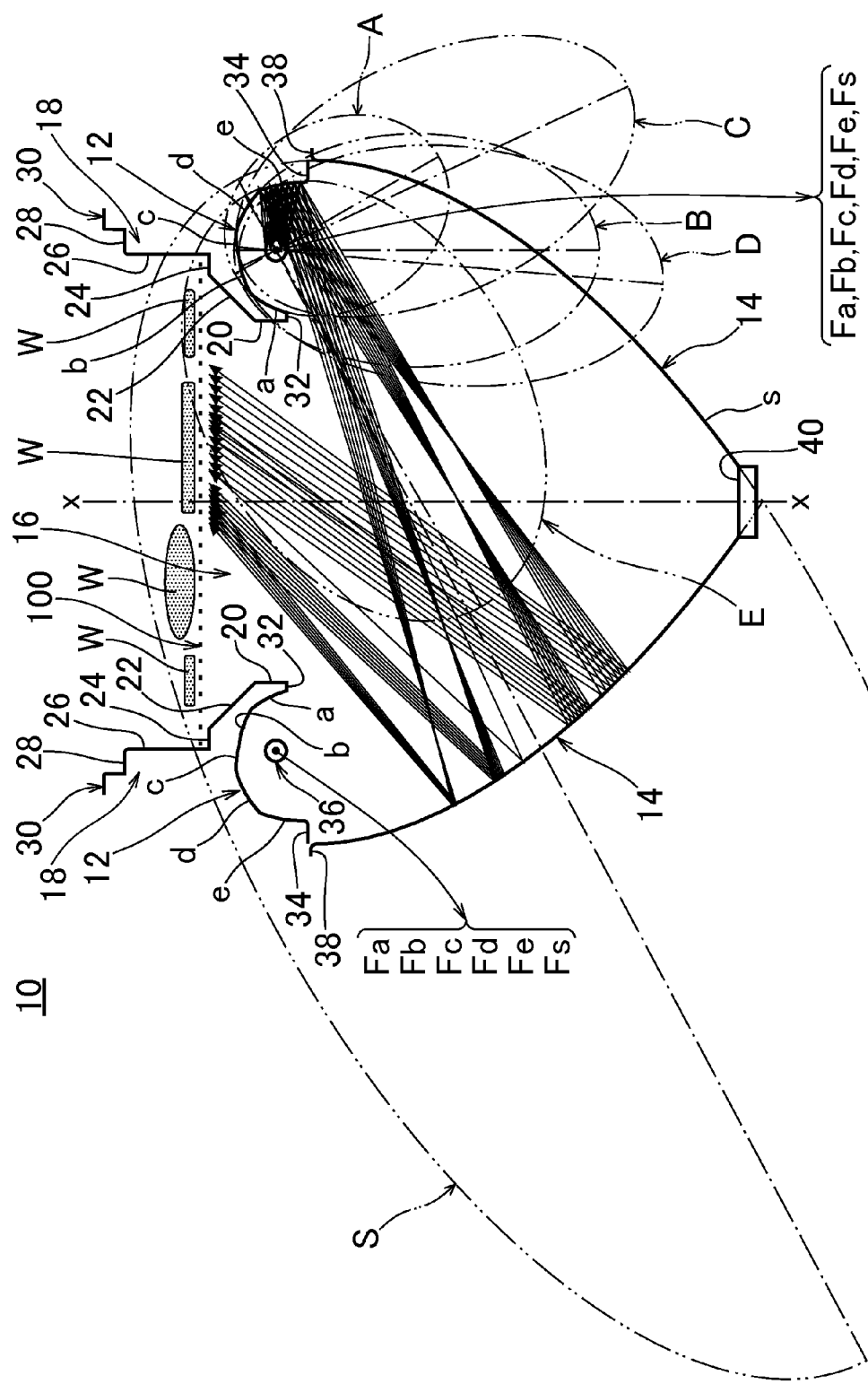

[Fig.8]
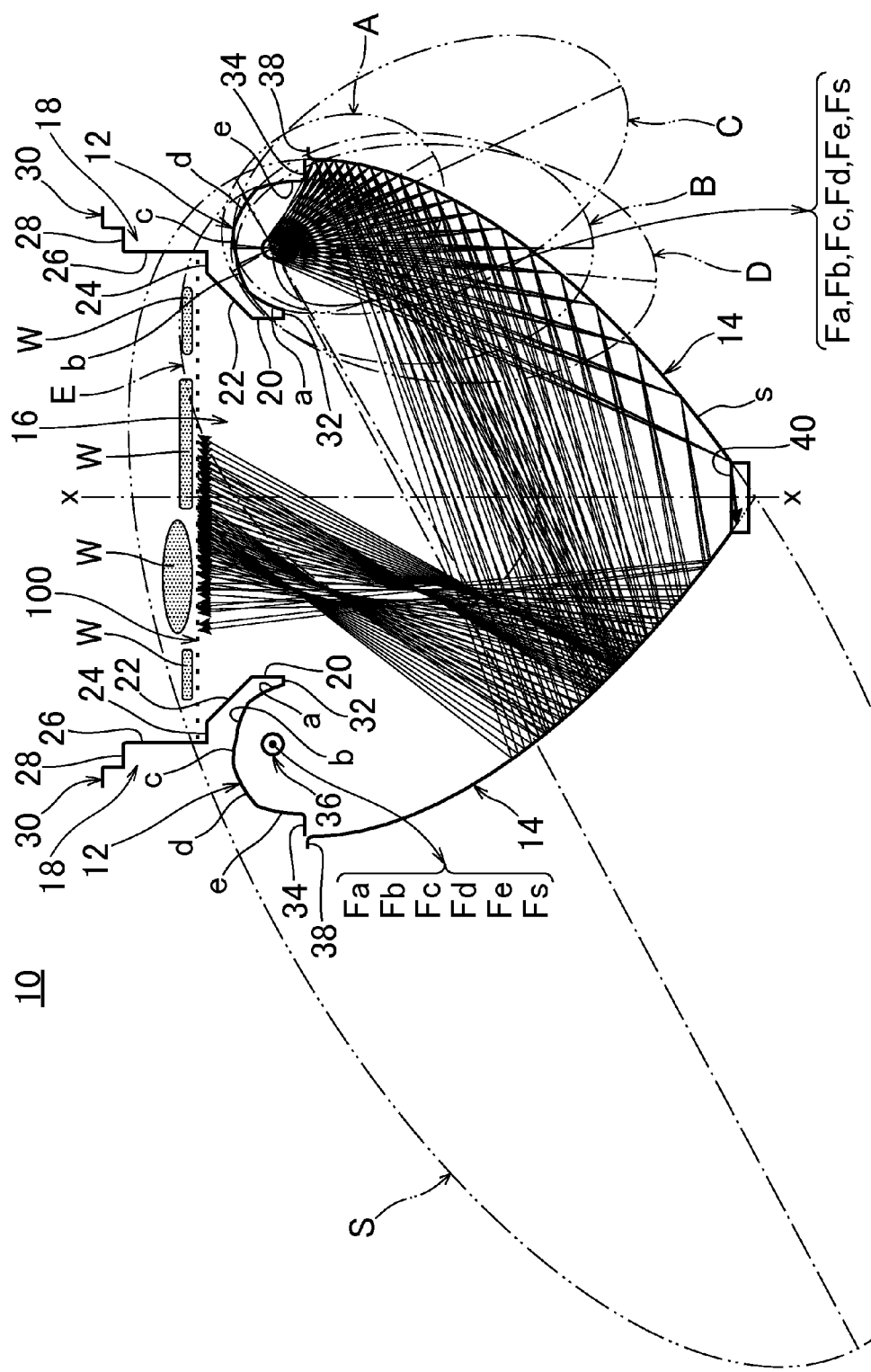

[Fig.9]
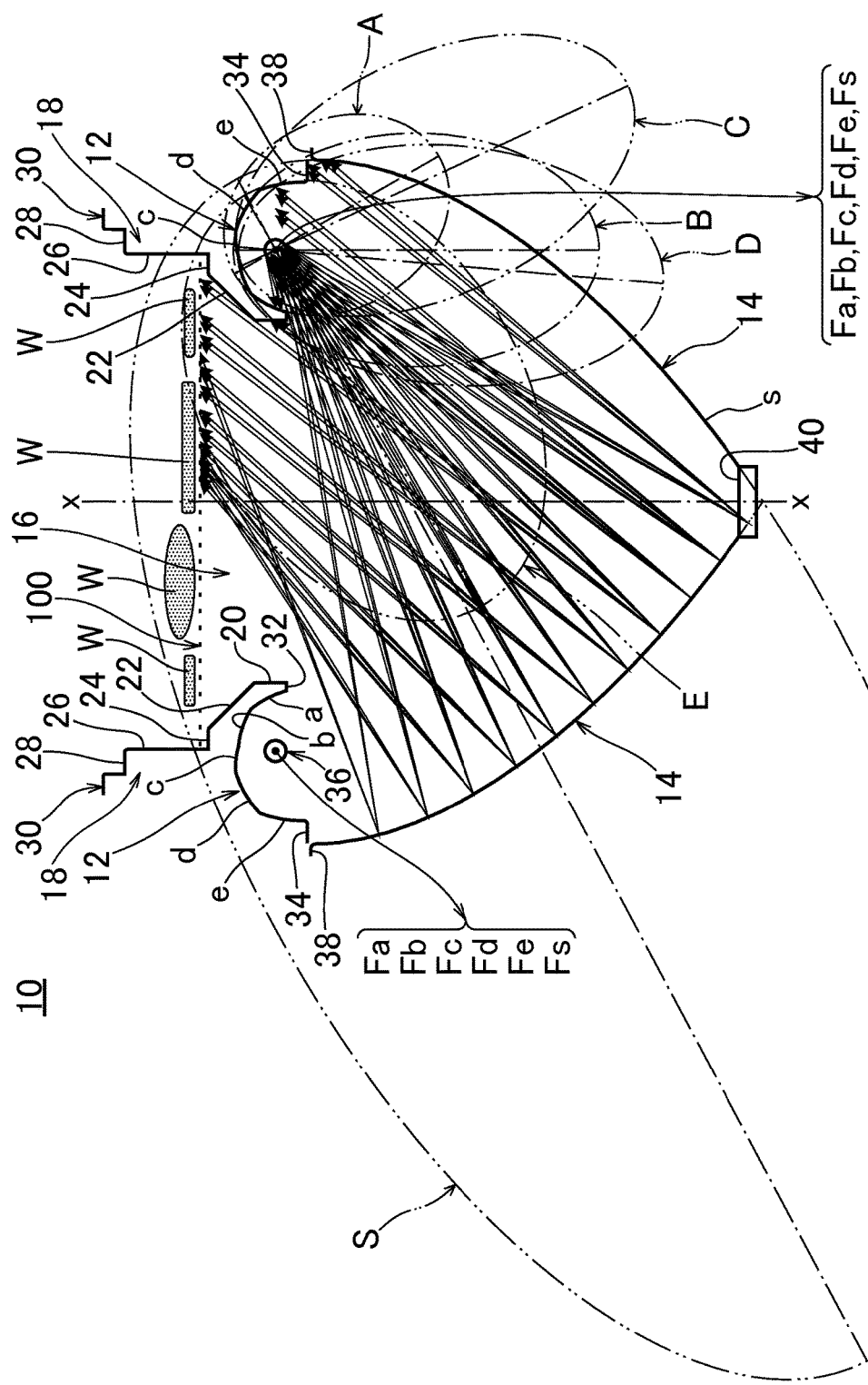

[Fig.10]
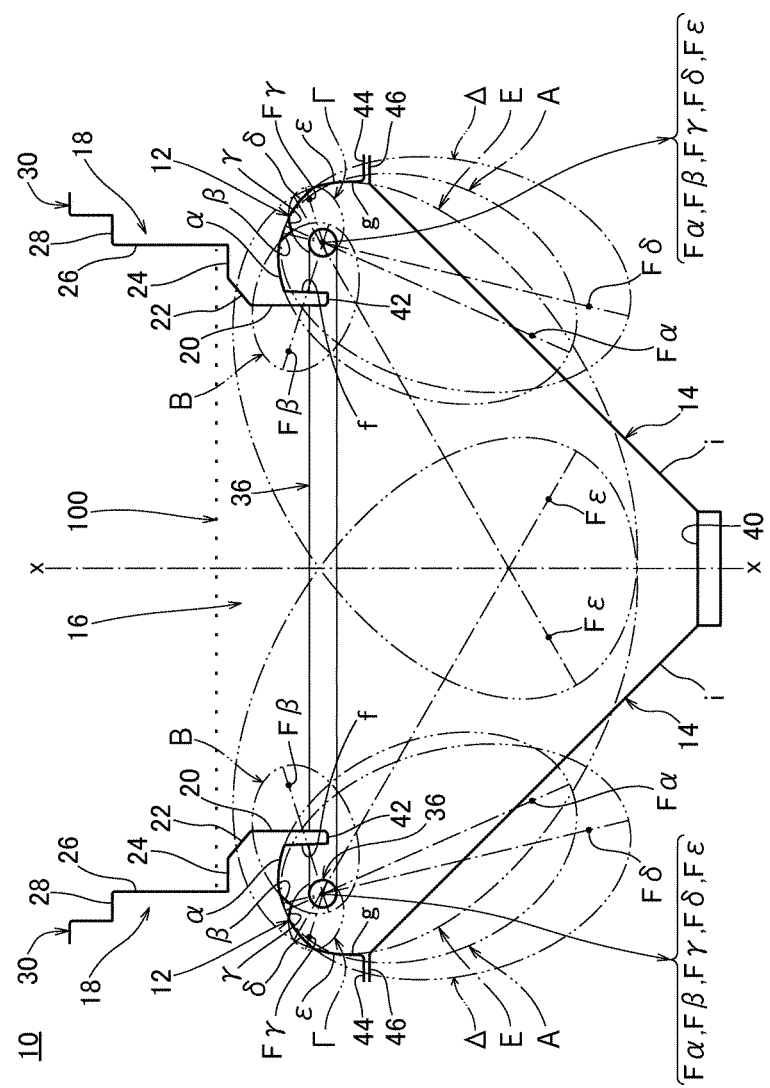

[Fig.11]
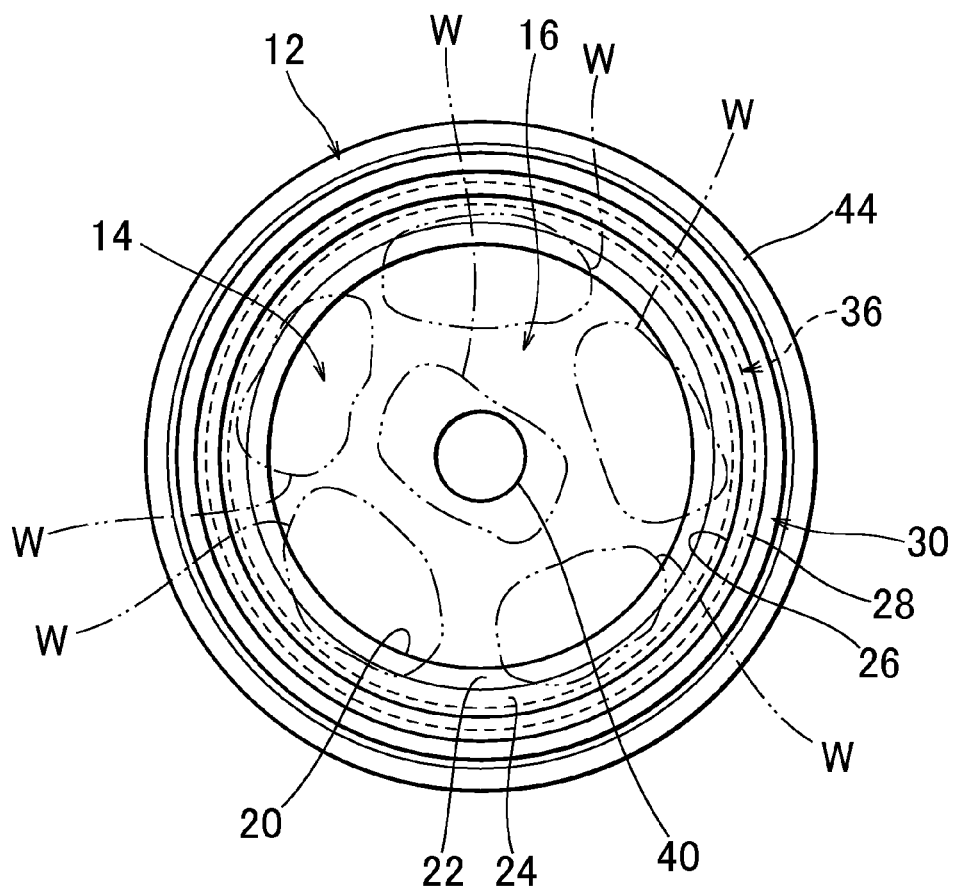

[Fig.12]
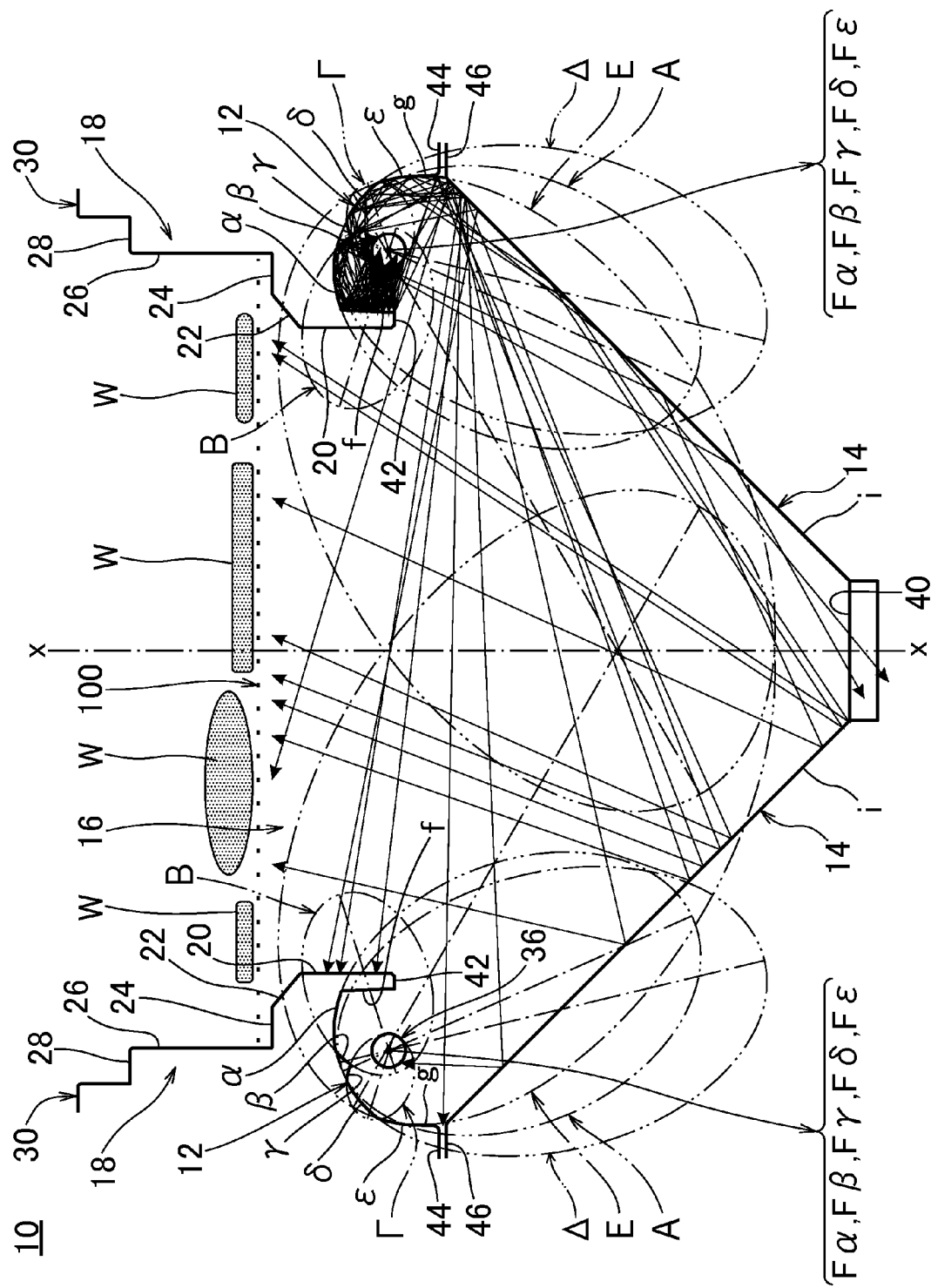

[Fig.13]
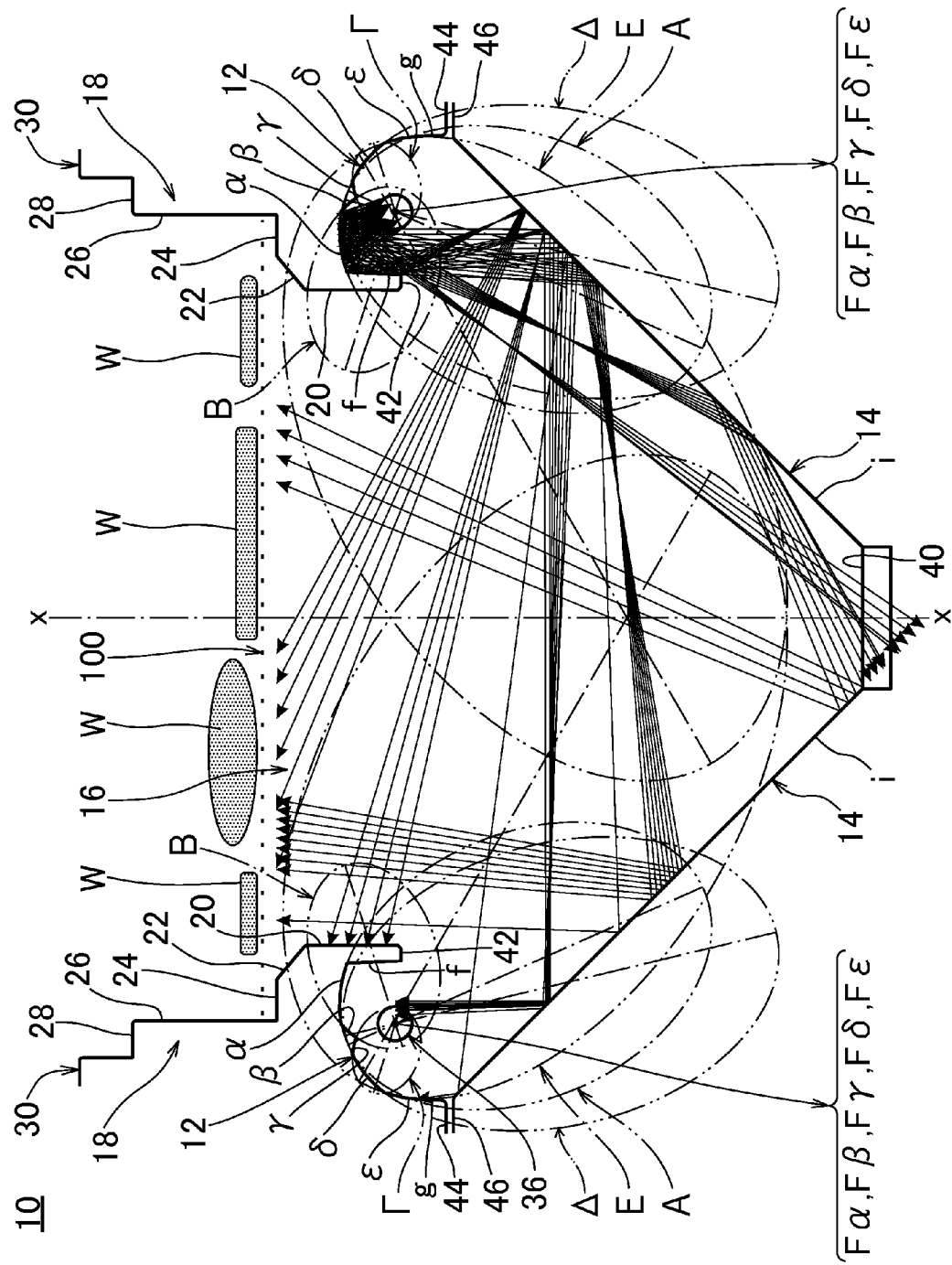

[Fig.14]
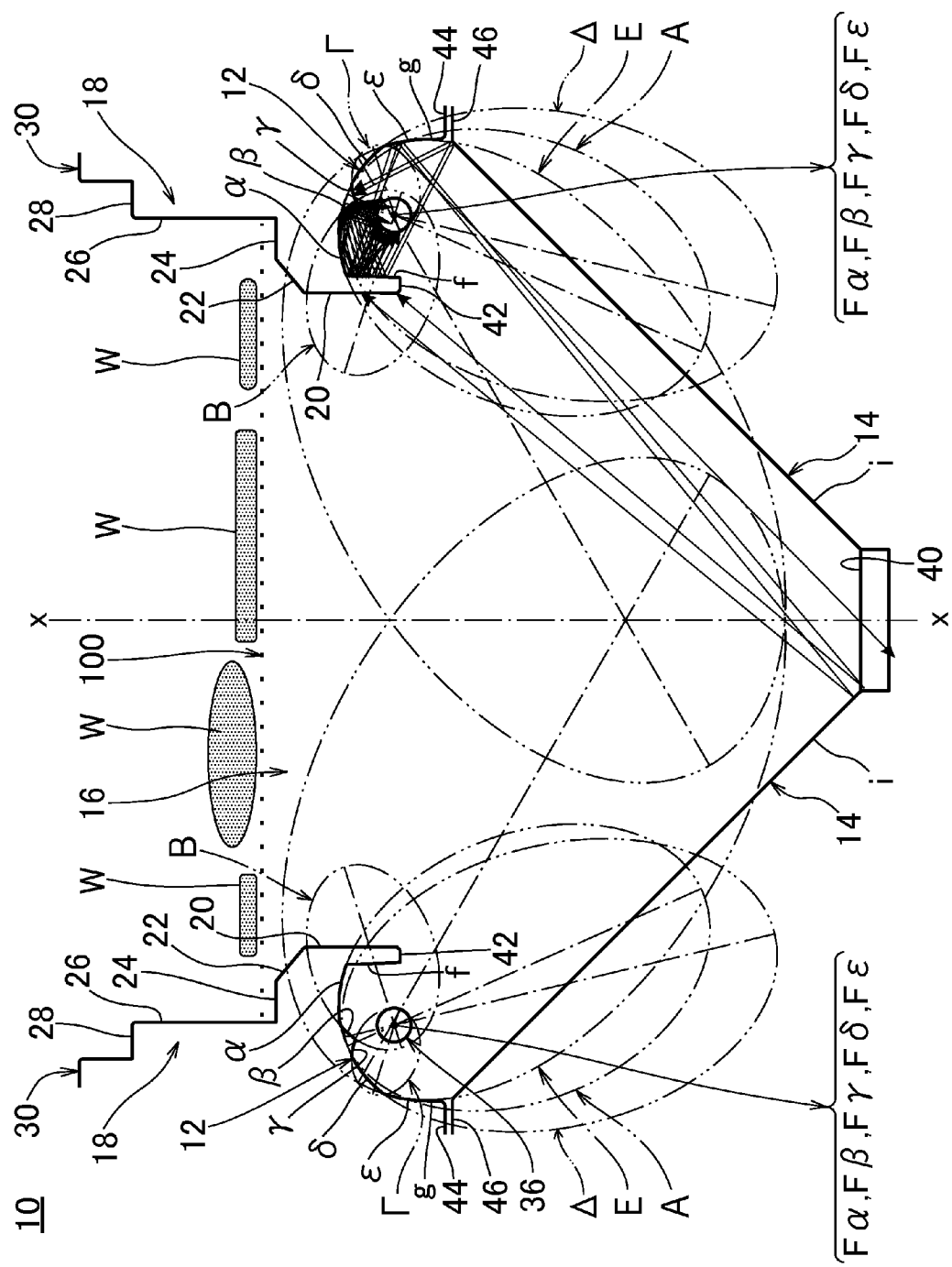

[Fig.15]
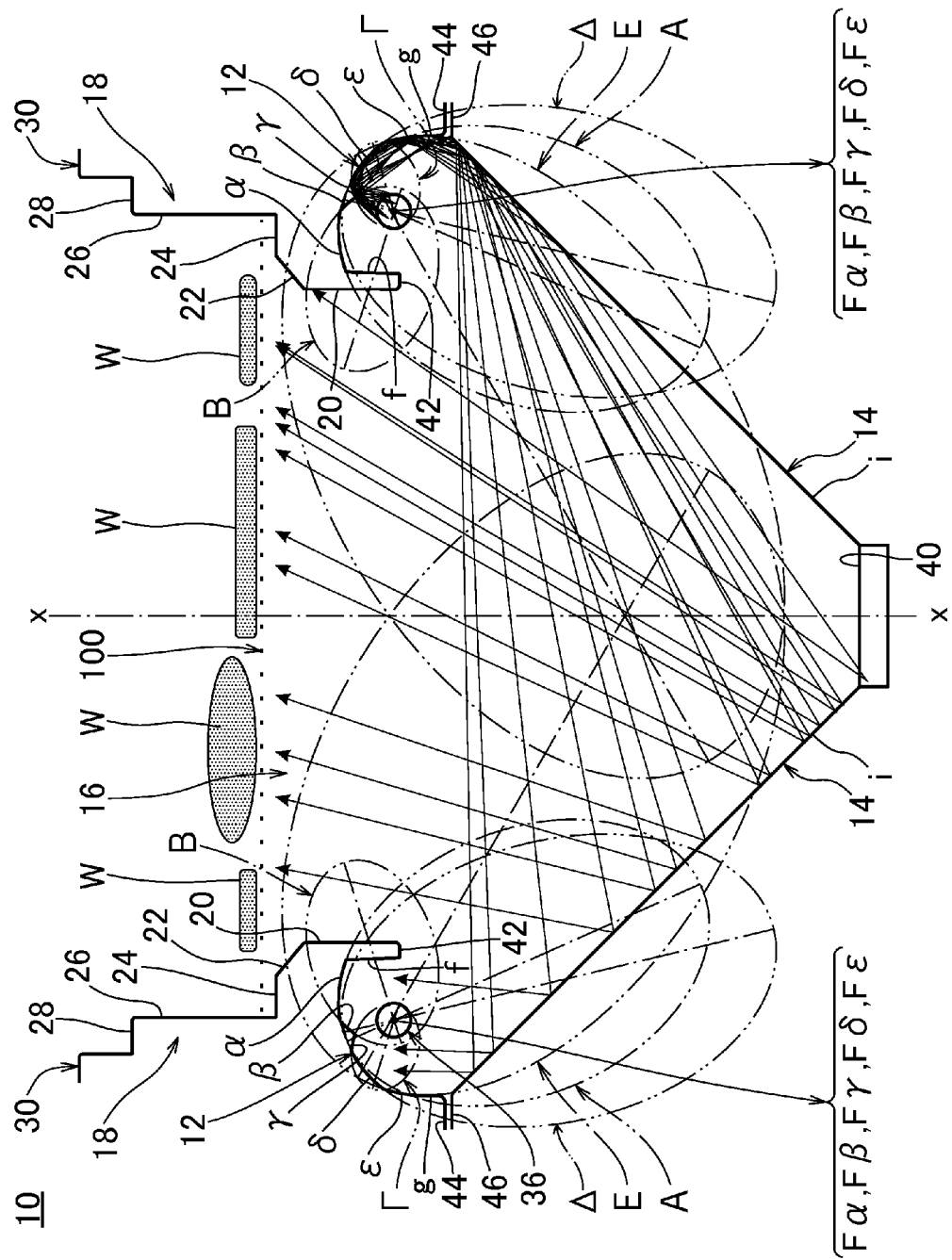

[Fig.16]
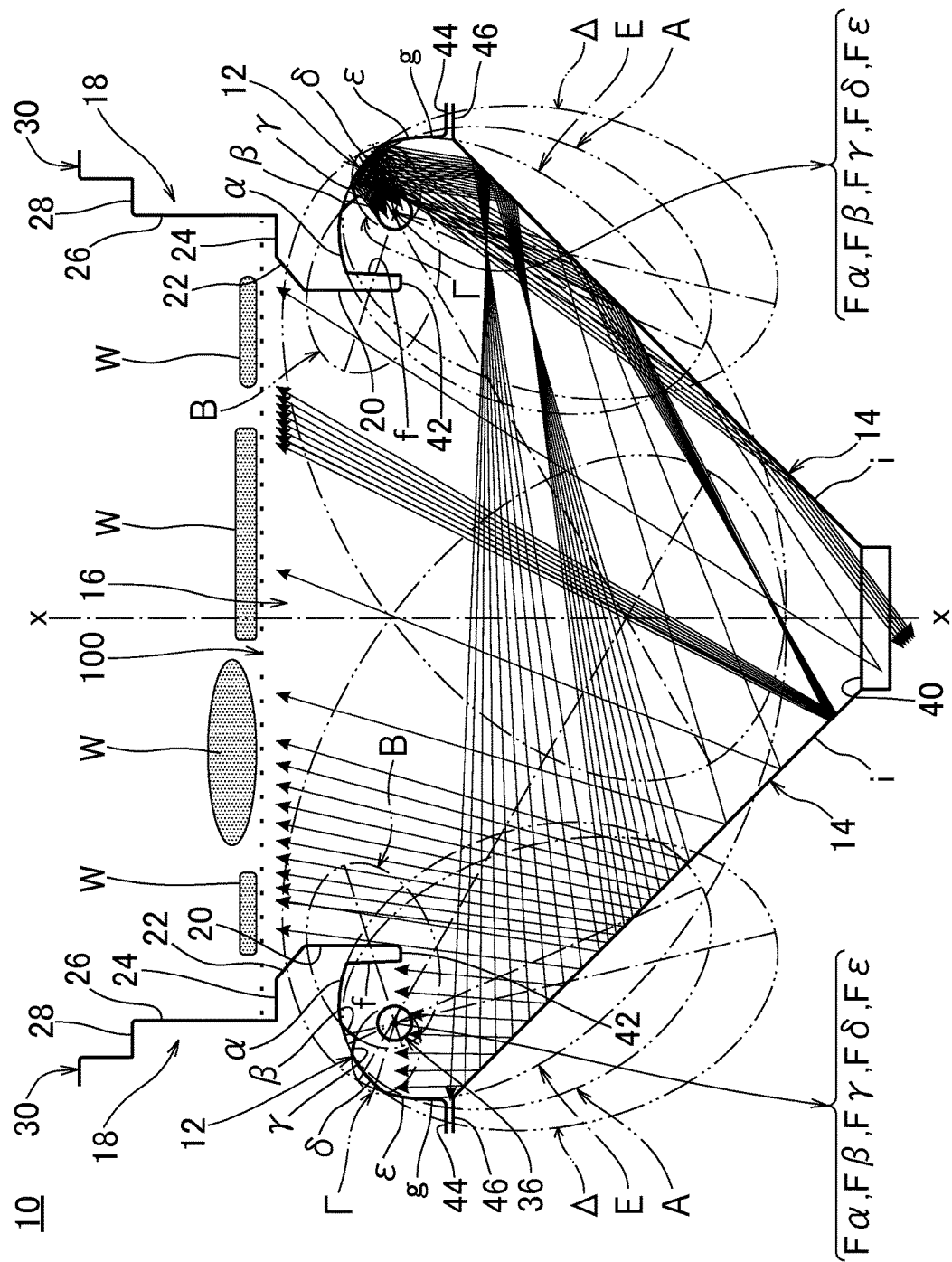

[Fig.17]
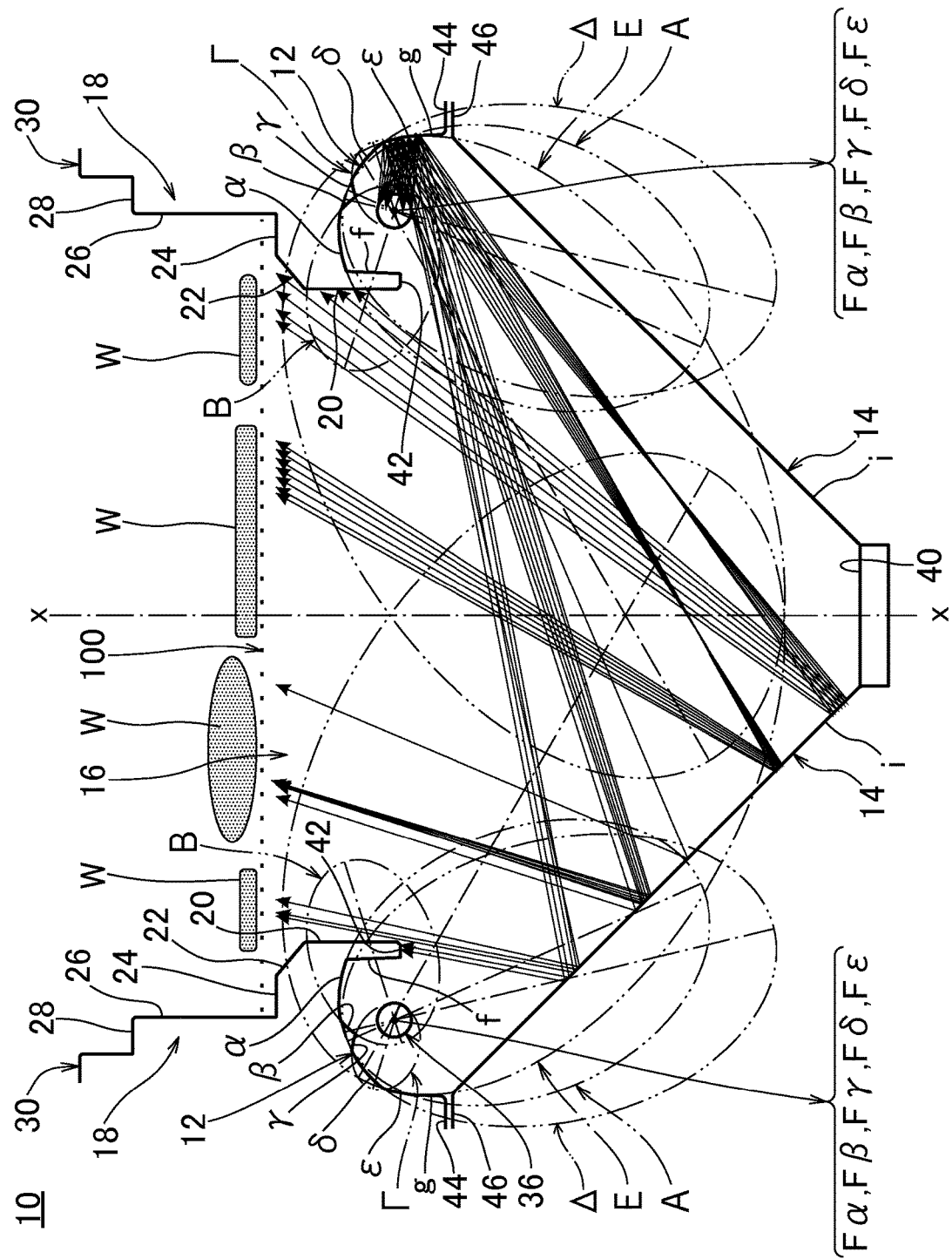

[Fig.18]
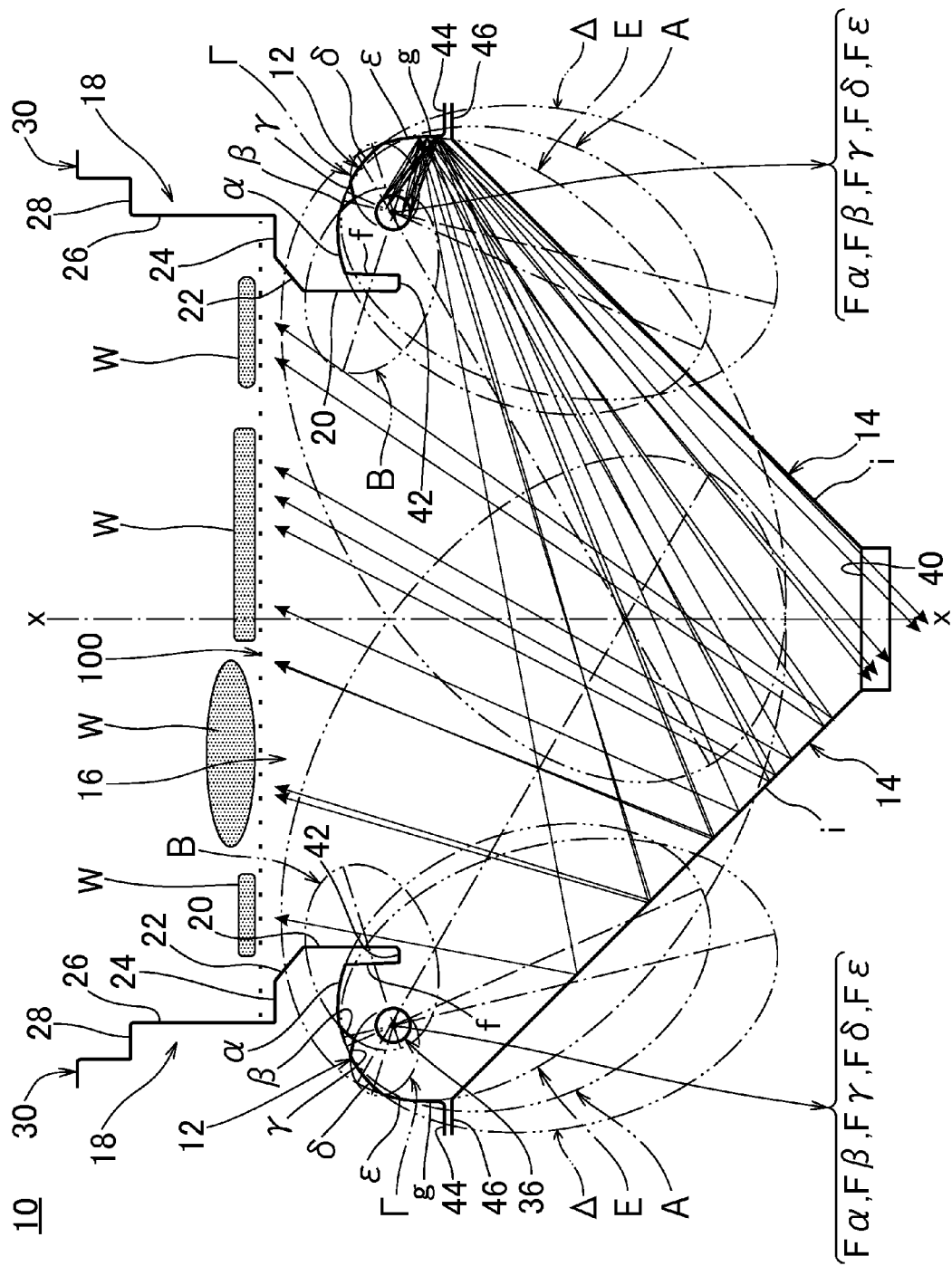

[Fig.19]
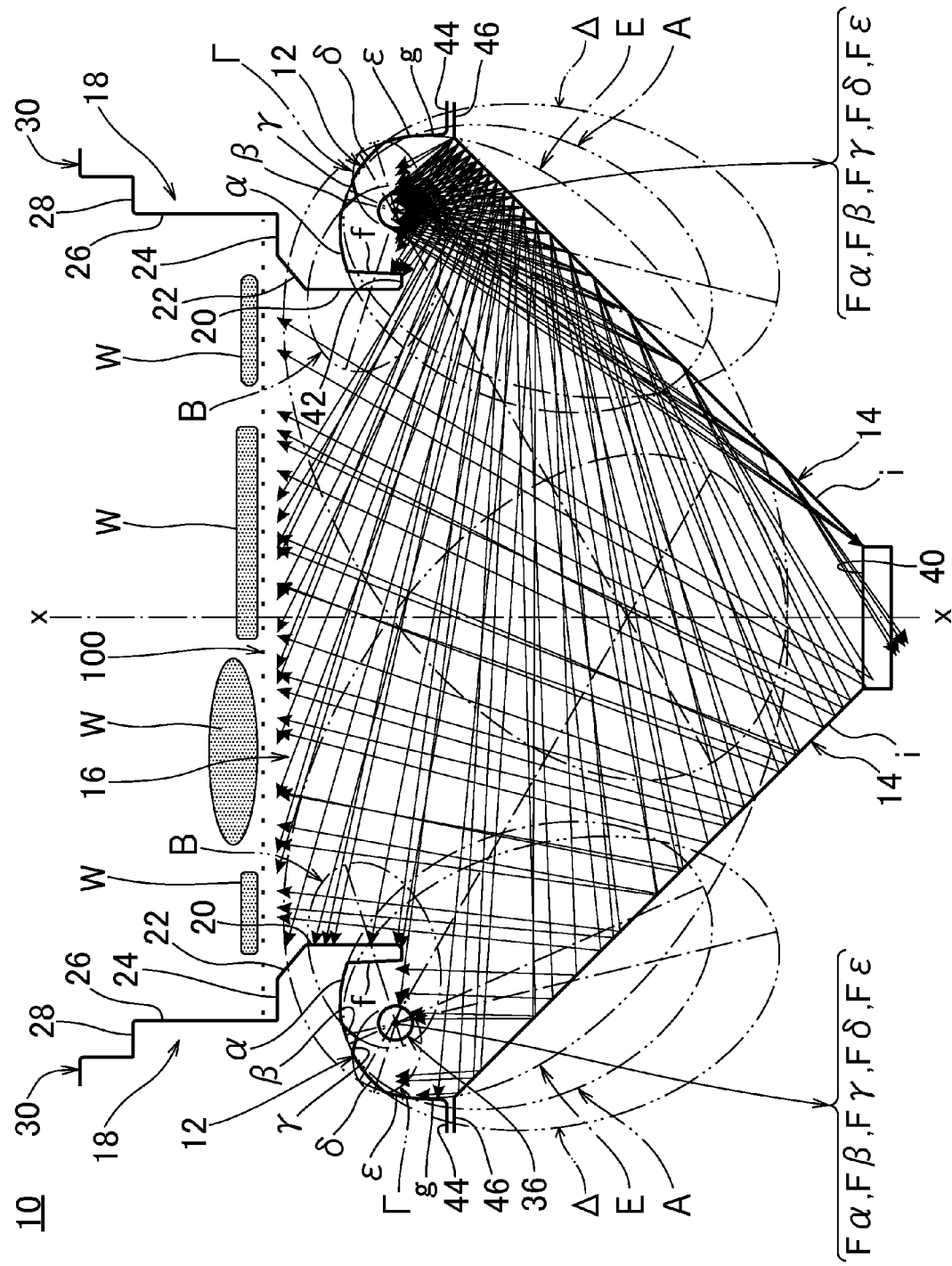

[Fig.20]
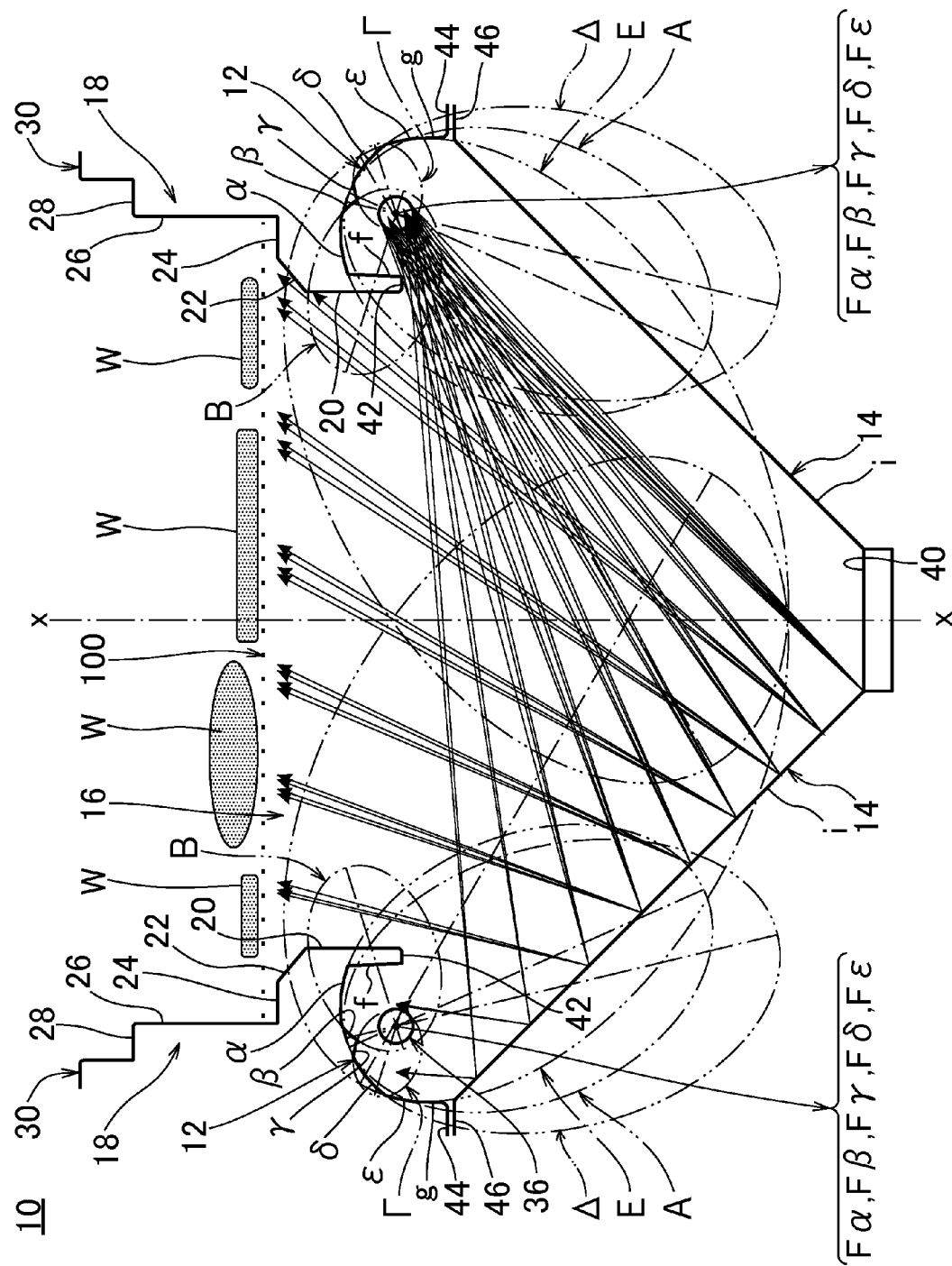

[Fig. 21]
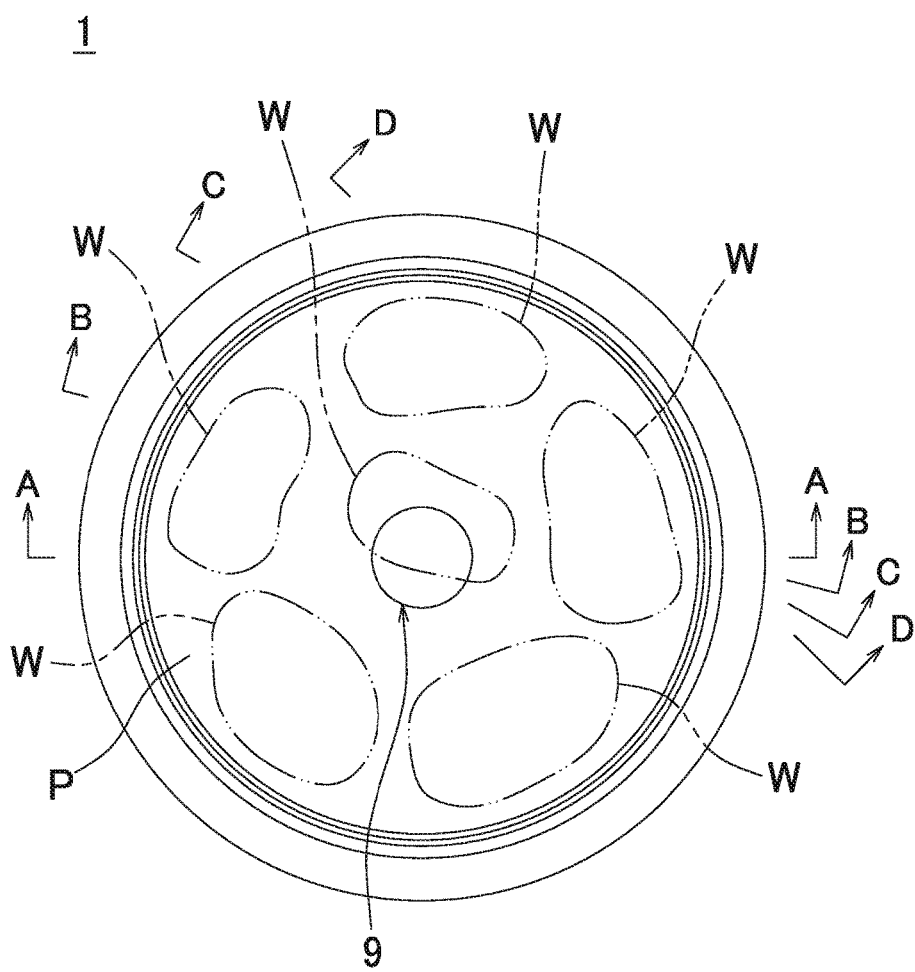
PRIOR ART

[Fig. 22]
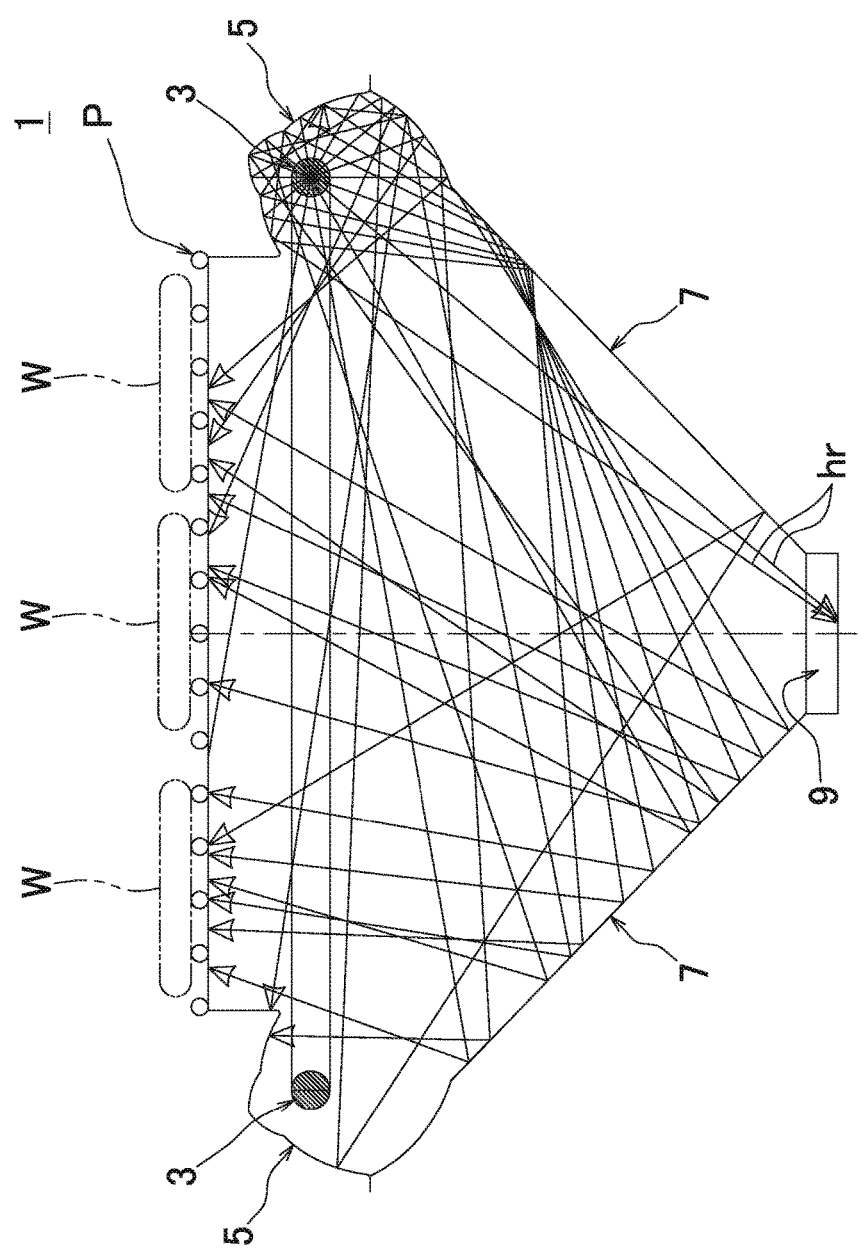
PRIOR ART

[Fig. 23]
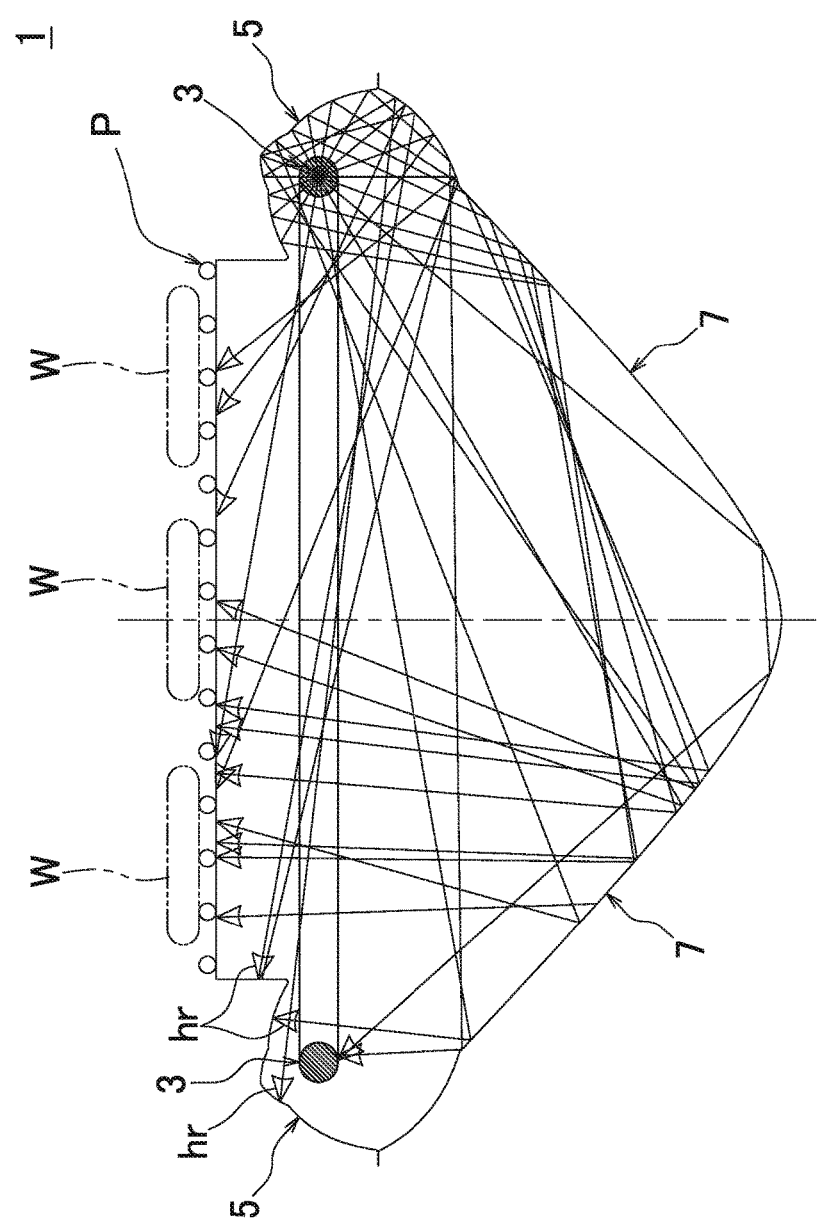
PRIOR ART

[Fig. 24]
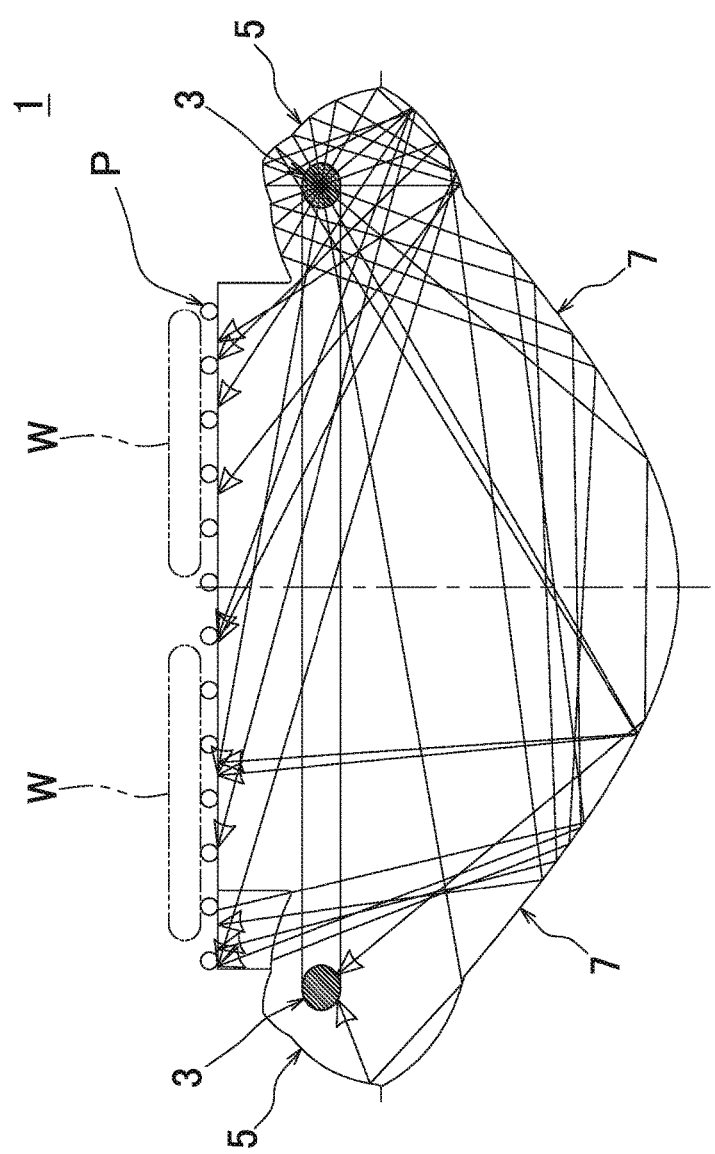

[Fig. 25]
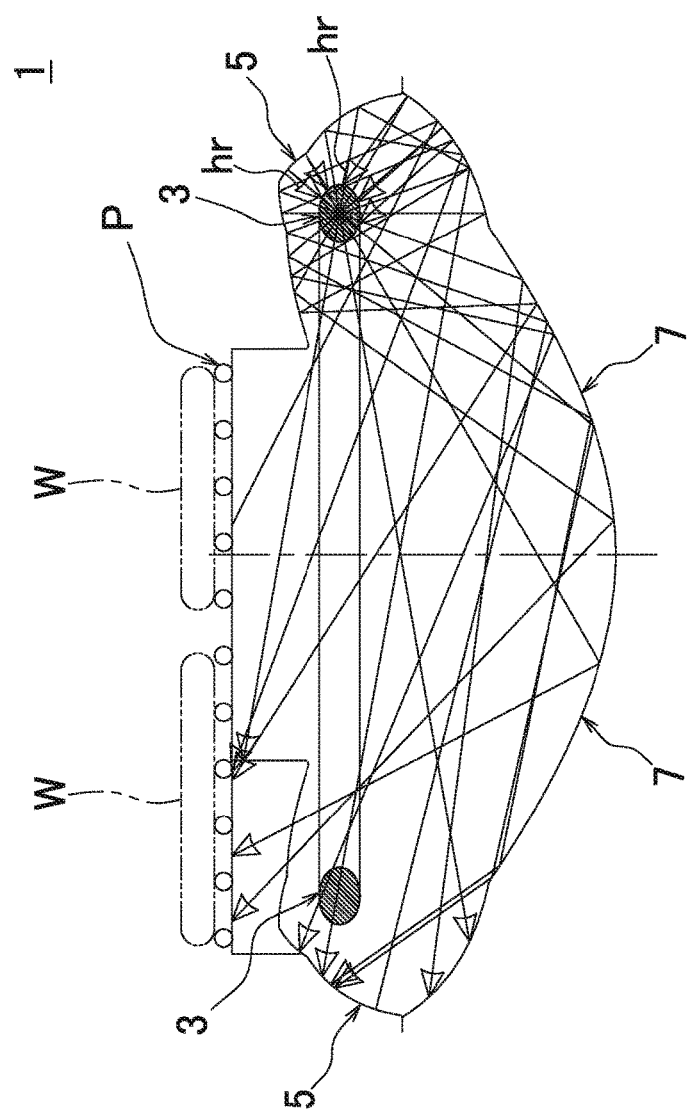

ELECTRIC STOVE

TECHNICAL FIELD

The present invention relates to an electric stove, particularly to an electric stove for heating a target to be heated by radiation heat, for example, used to cook fish, meat, vegetable, bread and other foods.

BACKGROUND ART

Various electric stoves capable of suppressing the production of smoke have been proposed by the present inventor as background conventional technology of the present invention (see, for example, patent literature 1).

This electric stove includes an electric heating element such as a sheathed heater provided at a distance from a position right below a target to be cooked (hereinafter, referred to as a "target to be heated") and a mirror surface portion for collecting heat rays radiated from the electric heating element to a side below the target to be heated. This mirror surface portion is configured to include a partial elliptical mirror surface portion which has one focus near the electric heating element and reflects the heat rays radiated from the electric heating element, a first reflecting mirror surface portion which is provided below the electric heating element and collects the heat rays reflected by the partial elliptical mirror surface portion to the side below the target to be heated, and a second reflecting mirror surface portion which is provided below the electric heating element and collects the heat rays not reflected by the first reflecting mirror surface portion to the side below the target to be heated.

However, in this electric stove, not all the heat rays radiated from the electric heating element and reflected by the partial elliptical mirror surface portion, the first and second reflecting mirror surface portions are efficiently radiated to a laying member such as a baking rack on which the target to be heated is placed, but there are heat rays accumulated in the electric stove. Since there is a loss in terms of thermal efficiency, the reflection efficiency of the heat rays on the mirror surface portion is far from satisfactory.

Accordingly, the present inventor proposed an electric stove improved to maximally reduce a loss in terms of thermal efficiency by increasing the reflection efficiency of heat rays on a mirror surface portion (see, for example, patent literature 2).

For example, as shown in FIGS. 21 and 22, this electric stove 1 is configured to include an electric heating element 3 arranged at a distance from a position right below targets to be heated W, a first mirror surface portion 5 including a partial elliptical mirror surface portion arranged to surround the electric heating element 3, having one focus near the electric heating element 3 and configured to reflect heat rays radiated from the electric heating element 3, and a second mirror surface portion 7 including a conical mirror surface portion arranged below the electric heating element 3 and configured to collect the heat rays reflected by the first mirror surface portion 5 to a side below the targets to be heated by reflecting them substantially immediately upwardly.

In this improved electric stove 1, the heat rays radiated form the electric heating element 3 are reflected by the first mirror surface portion 5. The heat rays reflected by the first mirror surface portion 5 are reflected immediately upwardly in a substantially vertical direction and collected to the side below the targets to be heated W by the action of the second mirror surface portion 7. Thus, in this electric stove 1, the heat rays can be irradiated to the side below the targets to be heated W with a small number of reflections as compared with conventional electric stoves, for example, as shown in patent literature 1 by reflecting the heat rays reflected by the first mirror surface portion 5 by the second mirror surface portion 7. In this case, the heat rays are less accumulated in an inner side surrounded by the first and second mirror surface portions 5, 7 and effectively collected to the side below the targets to be heated W. Further, less heat rays reflected by the second mirror surface portion 7 escape to a side (outer peripheral side) of this electric stove 1.

Patent Literature 1: Pamphlet of International Publication No. WO 07/102206 (see FIGS. 5, 6).

Patent Literature 2: Pamphlet of International Publication No. WO 09/130756 (see FIGS. 5 to 9).

SUMMARY OF INVENTION

Technical Problem

However, also in this improved electric stove 1, not all the heat rays radiated from the electric heating element 3 and reflected by the first and second mirror surface portions 5, 7 are efficiently irradiated to a laying member P such as a baking rack on which the targets to be heated W are placed, but there are still heat rays accumulated in the electric stove 1, for example, as shown in FIGS. 22 to 25. In this case, some of the heat rays radiated from the electric heating element 3 exit through a discharge opening 9 of the electric stove 1 without being reflected by the second mirror surface portion 7 even if being reflected by the first mirror surface portion 5 (see, for example, heat rays hr in FIG. 22), others are accumulated at the inner side of the first mirror surface portion 5 without being irradiated to the laying member P below the targets to be heated W even if being reflected by the first and second mirror surface portions 5, 7 (see, for example, heat rays hr in FIGS. 23, 24 and 25) or others escape to the outer peripheral side of the laying member P below the targets to be heated W without being irradiated to the laying member P below the targets to be heated W (see, for example, heat rays hr in FIG. 23).

Accordingly, the heat rays with low reflection efficiency still exist also in this improved electric stove 1, wherefore there is a loss in terms of thermal efficiency. Specifically, also in this improved electric stove 1, the problem of maximally reducing a loss in terms of thermal efficiency by increasing the reflection efficiency of heat rays remains to be solved.

Therefore, a main object of the present invention is to provide an electric stove capable of further reducing a loss in terms of thermal efficiency by further increasing the reflection efficiency of heat rays on a mirror surface portion.

Solution to Problem

A first aspect of the present invention is directed to an electric stove, comprising an electric heating element arranged at a distance from a position right below a target to be heated; a first mirror surface portion arranged to surround the electric heating element and configured to reflect heat rays radiated from the electric heating element; and a second mirror surface portion in the form of a quadric surface of revolution arranged below the electric heating element and configured to collect the heat rays reflected by the first mirror surface portion to a side below the target to be heated by reflecting the heat rays substantially immediately upwardly; wherein the first mirror surface portion includes a partial elliptical mirror surface portion having one focus near the electric heating element and the other focus below the electric heating element and configured to reflect the heat rays radiated from the electric heating element; and the second mirror surface portion includes a partial elliptical mirror surface portion having one focus near the electric heating element and the other focus below the electric heating element.

Since the present invention according to the first aspect has the above configuration, the heat rays radiated from the electric heating element are reflected by the first mirror surface portion. The heat rays reflected by the first mirror surface portion are reflected immediately upwardly in a substantially vertical direction and collected to the side below the target to be heated by the action of the second mirror surface portion. Thus, the target to be heated can be heated. Since each of the first and second mirror surface portions is configured to include the partial elliptical mirror surface portion having one focus near the electric heating element in this electric stove, the heat rays can be so reflected as not to diffuse by these partial elliptical mirror surface portions. In this case, the partial elliptical mirror surface portion included in the first mirror surface portion can reflect the heat rays radiated from the electric heating element to the second mirror surface portion so as not to diffuse the heat rays, and the second mirror surface portion including the partial elliptical mirror surface portion can reflect the heat rays reflected by the first mirror surface portion immediately upwardly so as not to diffuse the heat rays.

Specifically, in this electric stove, heat rays with low reflection efficiency can be reduced as compared with conventional electric stoves (see, for example, patent literatures 1 and 2). This enables a loss in terms of thermal efficiency to be further reduced by further increasing the reflection efficiency of heat rays on the first and second mirror surface portions in this electric stove, wherefore the heat rays can be effectively irradiated to the side below the target to be heated.

Accordingly, in this electric stove, the heat rays radiated from the electric heating element are quite efficiently collected to the side below the target to be heated with a small number of reflections such as one or two by the cooperative action of the first and second mirror surface portions, for example, as compared with conventional electric stoves shown in patent literatures 1 and 2. In this case, in this electric stove, the heat rays radiated from the electric heating element are hardly accumulated at an inner side enclosed by the first and second mirror surface portions and hardly escape to a side (outer peripheral side) of the electric stove. Therefore, a wide heating range where the target to be heated is heated can be ensured and the heating range can be uniformly and evenly heated in its peripheral edge part as well as its central part.

Further, since the electric heating element is arranged at a distance from the position right below the target to be heated in this electric stove, there is hardly any possibility that contaminants such as meat juice and oil adhere to the electric heating element when the target to be heated is food such as fish or meat. Thus, the production of smoke caused by the burning of contaminants adhering to the electric heating element can be maximally suppressed. In this case, a factor to reduce reflection efficiency due to the burning of contaminants adhering to the electric heating element can also be removed.

The present invention according to a second aspect is an invention dependent on the invention according to the first aspect and directed to an electric stove characterized in that the first mirror surface portion includes a plurality of partial elliptical mirror surface portions having one focus near the electric heating element and the other focus below the electric heating element.

Since the first mirror surface portion includes the plurality of partial elliptical mirror surface portions having the above configuration in the present invention according to the second aspect, the heat rays radiated from the electric heating element are more effectively reflected to the second mirror surface portion in such a manner as not to diffuse with high efficiency by the action of the plurality of partial elliptical mirror surface portions as compared with the electric stove according to the first aspect. Thus, in this electric stove, the heat rays can be further effectively irradiated to the side below the target to be heated as compared with the electric stove according to the first aspect.

The present invention according to a third aspect is directed to an electric stove, comprising an electric heating element arranged at a distance from a position right below a target to be heated; a first mirror surface portion arranged to surround the electric heating element and configured to reflect heat rays radiated from the electric heating element; and a second mirror surface portion in the form of a quadric surface of revolution arranged below the electric heating element and configured to collect the heat rays reflected by the first mirror surface portion to a side below the target to be heated by reflecting the heat rays substantially immediately upwardly; wherein the first mirror surface portion includes three or more partial elliptical mirror surface portions having one focus near the electric heating element and the other focus below the electric heating element and configured to reflect the heat rays radiated from the electric heating element; and the second mirror surface portion includes a conical mirror surface portion.

Since the present invention according to the third aspect has the above configuration, the heat rays radiated from the electric heating element are reflected by the first mirror surface portion. The heat rays reflected by the first mirror surface portion are reflected immediately upwardly in a substantially vertical direction and collected to the side below the target to be heated by the action of the second mirror surface portion. Thus, the target to be heated can be heated.

Since the first mirror surface portion includes at least three partial elliptical mirror surface portions having the above configuration in this electric stove, the heat rays radiated from the electric heating element can be further reflected to the second mirror surface portion in such a manner as not to diffuse by these partial elliptical mirror surface portions of the first mirror surface portion.

Further, the second mirror surface portion including the conical mirror surface portion can reflect the heat rays reflected by the first mirror surface portion immediately upwardly in a substantially vertical direction with a small number of reflections such as one or two. In this case, since the second mirror surface portion includes the conical mirror surface portion in the electric stove according to the third aspect, the heat rays diffuse on the second mirror surface portion and the reflection efficiency of the heat rays on the second mirror surface portion is reduced as compared with electric stoves in which a second mirror surface portion contains a partial elliptical mirror surface portion like the electric stove according to the first aspect. However, for example, as compared with the conventional electric stoves shown in patent literatures 1 and 2, heat rays with low reflection efficiency can be reduced. Therefore, in this electric stove, the heat rays can be effectively irradiated to the side below the target to be heated by reducing a loss in terms of thermal efficiency as compared with the conventional technology.

This electric stove differs from the electric stoves according to the above first and second aspects particularly in that the first mirror surface portion includes at least three partial elliptical mirror surface portions and the second mirror surface portion includes the conical mirror surface portion, and functions and effects thereof are different due to these differences. However, for example, as compared with the conventional electric stoves disclosed in patent literatures 1 and 2, this is an electric stove further improved so that reflection efficiency can be further increased and a loss in terms of thermal efficiency can be further reduced by maximally preventing the diffusion of the heat rays radiated from the electric heating element on the first mirror surface portion and further collecting the heat rays to the side below the target to be heated by reflecting the heat rays substantially immediately upwardly with a small number of reflections such as one or two on the second mirror surface portion as described above.

It should be noted that, in the electric stoves according to the above first and second aspects, the first mirror surface portion may include at least three partial elliptical mirror surface portions having one focus near the electric heating element and the other focus below the electric heating element and configured to reflect the heat rays radiated from the electric heating element. In this case, the heat rays radiated from the electric heating element are more effectively reflected with high efficiency to the second mirror surface portion in such a manner as not to diffuse.

Further, in the electric stove according to any one of the above first to third aspects, the electric heating element may include an annular electric heating element.

Further, in the electric stove according to any one of the above first to third aspects, the first mirror surface portion may include a partial elliptical rotational surface portion having one focus near the electric heating element and the other focus at least either below or above the electric heating element.

Further, in the electric stove according to any one of the above first to third aspects, the first mirror surface portion may include a partial elliptical mirror surface portion having one focus near the electric heating element and the other focus below the electric heating element and a partial elliptical mirror surface portion having one focus near the electric heating element and the other focus above the electric heating element.

Further, in the electric stove according to any one of the above first to third aspects, the electric heating element may include an annular electric heating element and the first mirror surface portion may include a partial elliptical rotational surface portion having one focus near the electric heating element and the other focus near the electric heating element facing with a center point of the annular electric heating element in a diametric direction as a center axis.

Further, in the electric stove according to any one of the above first to third aspects, the electric heating element may include an annular electric heating element and the first mirror surface portion may include a partial elliptical rotational surface portion having one focus near the electric heating element and the other focus near the electric heating element facing with a center point of the annular electric heating element in a diametric direction as a center axis and a partial elliptical rotational surface portion having one focus near the electric heating element and the other focus at least either below or above the electric heating element.

Advantageous Effects of Invention

According to the present invention, an electric stove is obtained which is further improved to be able to further reduce a loss in terms of thermal efficiency by further increasing the reflection efficiency of heat rays on a mirror surface portion.

The aforementioned object, other objects, features and advantages of the present invention will become apparent from the following detailed description of the embodiments of the present invention with reference to the drawings.

BRIEF DESCRIPTION OF DRAWINGS

FIG. 1 is a schematic front view in section showing an example of an embodiment of the present invention, FIG. 2 is a schematic plan view of the embodiment shown in FIG. 1, FIG. 3 is a explanatory diagram showing reflection paths of heat rays radiated from an electric heating element when targets to be heated were heated using an electric stove according to the embodiment shown in FIGS. 1 and 2, FIG. 4 is another explanatory diagram showing reflection paths of heat rays radiated from the electric heating element when the targets to be heated were heated using the electric stove according to the embodiment shown in FIGS. 1 and 2, FIG. 5 is still another explanatory diagram showing reflection paths of heat rays radiated from the electric heating element when the targets to be heated were heated using the electric stove according to the embodiment shown in FIGS. 1 and 2, FIG. 6 is still another explanatory diagram showing reflection paths of heat rays radiated from the electric heating element when the targets to be heated were heated using the electric stove according to the embodiment shown in FIGS. 1 and 2, FIG. 7 is still another explanatory diagram showing reflection paths of heat rays radiated from the electric heating element when the targets to be heated were heated using the electric stove according to the embodiment shown in FIGS. 1 and 2, FIG. 8 is still another explanatory diagram showing reflection paths of heat rays radiated from the electric heating element when the targets to be heated were heated using the electric stove according to the embodiment shown in FIGS. 1 and 2, FIG. 9 is still another explanatory diagram showing reflection paths of heat rays radiated from the electric heating element when the targets to be heated were heated using the electric stove according to the embodiment shown in FIGS. 1 and 2, FIG. 10 is a schematic front view in section showing another example of the embodiment of the present invention, FIG. 11 is a schematic plan view of the embodiment shown in FIG. 10, FIG. 12 is a explanatory diagram showing reflection paths of heat rays radiated from an electric heating element when targets to be heated were heated using an electric stove according to the embodiment shown in FIGS. 10 and 11, FIG. 13 is another explanatory diagram showing reflection paths of heat rays radiated from the electric heating element when the targets to be heated were heated using the electric stove according to the embodiment shown in FIGS. 10 and 11, FIG. 14 is still another explanatory diagram showing reflection paths of heat rays radiated from the electric heating element when the targets to be heated were heated using the electric stove according to the embodiment shown in FIGS. 10 and 11, FIG. 15 is still another explanatory diagram showing reflection paths of heat rays radiated from the electric heating element when the targets to be heated were heated using the electric stove according to the embodiment shown in FIGS. 10 and 11, FIG. 16 is still another explanatory diagram showing reflection paths of heat rays radiated from the electric heating element when the targets to be heated were heated using the electric stove according to the embodiment shown in FIGS. 10 and 11, FIG. 17 is still another explanatory diagram showing reflection paths of heat rays radiated from the electric heating element when the targets to be heated were heated using the electric stove according to the embodiment shown in FIGS. 10 and 11, FIG. 18 is still another explanatory diagram showing reflection paths of heat rays radiated from the electric heating element when the targets to be heated were heated using the electric stove according to the embodiment shown in FIGS. 10 and 11, FIG. 19 is still another explanatory diagram showing reflection paths of heat rays radiated from the electric heating element when the targets to be heated were heated using the electric stove according to the embodiment shown in FIGS. 10 and 11, FIG. 20 is still another explanatory diagram showing reflection paths of heat rays radiated from the electric heating element when the targets to be heated were heated using the electric stove according to the embodiment shown in FIGS. 10 and 11, FIG. 21 is a schematic plan view showing an example of a conventional electric stove as a background art of the present invention and a explanatory diagram showing reflection paths of heat rays radiated from an electric heating element when targets to be heated were heated using this conventional electric stove, FIG. 22 is a explanatory diagram showing reflection paths of heat rays in an A-A cross-section of FIG. 21, FIG. 23 is a explanatory diagram showing reflection paths of heat rays in a B-B cross-section of FIG. 21, FIG. 24 is a explanatory diagram showing reflection paths of heat rays in a C-C cross-section of FIG. 21, and FIG. 25 is a explanatory diagram showing reflection paths of heat rays in a D-D cross-section of FIG. 21.

REFERENCE SIGNS LIST

10 electric stove
12 first mirror surface portion
14 second mirror surface portion
16 opening
18 cooking booth
20 bottom frame
22 hopper portion
24 projecting piece
26 standing piece
28 flange piece
30 bracket
32 one flange piece of first mirror surface portion
34 other flange piece of first mirror surface portion
36 sheathed heater
38 flange piece of second mirror surface portion
40 discharge opening
42 one flange piece of another first mirror surface portion
44 other flange piece of another first mirror surface portion
46 one flange piece of another second mirror surface portion
100 laying member
W target to be cooked (target to be heated)
a first partial elliptical mirror surface portion
b second partial elliptical mirror surface portion
c third partial elliptical mirror surface portion
d fourth partial elliptical mirror surface portion
e fifth partial elliptical mirror surface portion
s partial elliptical mirror surface portion of second mirror surface portion
A rotational elliptical surface of first partial elliptical mirror surface portion
B rotational elliptical surface of second partial elliptical mirror surface portion
C rotational elliptical surface of third partial elliptical mirror surface portion
D rotational elliptical surface of fourth partial elliptical mirror surface portion
E rotational elliptical surface of fifth partial elliptical mirror surface portion
S rotational elliptical surface of partial elliptical mirror surface portion of second mirror surface portion
Fa one and other focuses of first partial elliptical mirror surface portion
Fb one and other focuses of second partial elliptical mirror surface portion
Fc one and other focuses of third partial elliptical mirror surface portion
Fd one and other focuses of fourth partial elliptical mirror surface portion
Fe one and other focuses of fifth partial elliptical mirror surface portion
Fs one and other focuses of partial elliptical mirror surface portion of second mirror surface portion

EMBODIMENTS OF INVENTION

First Embodiment

In an electric stove according to this embodiment, the object to further reduce a loss in terms of thermal efficiency by further increasing the reflection efficiency of heat rays radiated from an electric heating element on a first mirror surface portion and a second mirror surface portion is achieved by reflecting heat rays on a first mirror surface portion including a plurality of partial elliptical mirror surface portions having one focus near an arrangement position of the electric heating element and a second mirror surface portion including a single partial elliptical mirror surface portion having one focus at the same position as the former focus to collect the heat rays to a side below a target to be heated by reflecting the heat rays substantially immediately upwardly.

FIG. 1 is a schematic front view in section showing an example of the embodiment of the present invention, and FIG. 2 is a schematic plan view of the embodiment shown in FIG. 1. Further, FIGS. 3 to 9 are explanatory diagrams showing reflection paths of heat rays radiated from an electric heating element when targets to be heated were heated using an electric stove according to the embodiment shown in FIGS. 1 and 2.

An electric stove 10 according to this embodiment is briefly described, for example, with reference to any one of FIGS. 3 to 9. The electric stove 10 includes electric heating elements such as sheathed heaters 36 provided at a distance from a position right below targets to be cooked W (hereinafter, referred to as "targets to be heated W") such as meat, fish, vegetable or bread, a first mirror surface portion 12 arranged to surround the sheathed heaters 36 and configured to reflect heat rays radiated from the sheathed heaters 36 and a second mirror surface portion 14 arranged below the sheathed heaters 36 and configured to collect the heat rays reflected by the first mirror surface portion 12 to a side below the targets to be heated W by reflecting the heat rays substantially immediately upwardly.

Since the electric stove 10 according to this embodiment is characterized particularly by the configurations of the first and second mirror surface portions 12, 14 for reflecting the heat rays radiated from the sheathed heaters 36, the configurations of the first and second mirror surface portions 12, 14 and the electric heating elements such as the sheathed heaters 36 and the arrangement thereof are mainly described in this embodiment.

Specifically, this electric stove 10 includes the first mirror surface portion 12, the second mirror surface portion 14 arranged below the first mirror surface portion 12, and a cooking booth 18 arranged above the first mirror surface portion 12 and including an opening 16 as a passage opening through which the heat rays reflected by the first and second mirror surface portions 12, 14 pass and as an irradiation opening for the heat rays particularly, for example, as shown in FIG. 1.

Particularly, for example, as shown in FIG. 1, the first mirror surface portion 12 includes, for example, five partial elliptical mirror surface portions of a first partial elliptical mirror surface portion a, a second partial elliptical mirror surface portion b, a third partial elliptical mirror surface portion c, a fourth partial elliptical mirror surface portion d and a fifth partial elliptical mirror surface portion e and is formed by connecting the five partial elliptical mirror surface portions a to e. Each of the first to fifth partial elliptical mirror surface portions a to e is formed by a partial elliptical rotational surface portion.

The first partial elliptical mirror surface portion a is formed as a partial surface of a rotational elliptical surface A having one focus Fa and the other focus Fa. Similarly, the second partial elliptical mirror surface portion b is formed as a partial surface of a rotational elliptical surface B having one focus Fb and the other focus Fb, the third partial elliptical mirror surface portion c is formed as a partial surface of a rotational elliptical surface C having one focus Fc and the other focus Fc, the fourth partial elliptical mirror surface portion d is formed as a partial surface of a rotational elliptical surface D having one focus Fd and the other focus Fd and the fifth partial elliptical mirror surface portion e is formed as a partial surface of a rotational elliptical surface E having one focus Fe and the other focus Fe. It should be noted that the "rotational elliptical surface" described above means a surface of a rotational ellipsoid.

In this case, the one focuses Fa to Fe of the first to fifth partial elliptical mirror surface portions a to e are arranged at the same position. That is, the one focuses Fa to Fe of the first to fifth partial elliptical mirror surface portions a to e share one focus. Further, each of the first to fifth partial elliptical mirror surface portions a to e is so formed that the other focuses Fa to Fe thereof is located below the first mirror surface portion 12.

The first to fifth partial elliptical mirror surface portions a to e forming the first mirror surface portion 12 are, for example, formed by bending a single metal plate of stainless steel, silver or the like through metal working and mirror finishing is applied at least to surfaces, which become the inner peripheral surfaces of the first to fifth partial elliptical mirror surface portions a to e, to form mirror surfaces.

The cooking booth 18 is arranged above the first mirror surface portion 12. Particularly as shown in FIG. 1, the cooking booth 18 is provided with a cylindrical bottom frame 20, a hopper portion 22 connected to an upper end peripheral edge part of the bottom frame 20, an annular projecting piece 24 projecting outward from an upper end peripheral edge part of the hopper portion 22 and circular in a plan view, a standing piece 26 extending substantially vertically from the outer peripheral edge of the projecting piece 24 and a flange piece 28 having an L-shaped cross-section, and includes a bracket 30 provided on an upper end peripheral edge part of the standing piece 26. The cooking booth 18 is connected to the first mirror surface portion 12. In this case, flange pieces 32, 34 respectively projecting outward are provided on peripheral edge parts of one and the other ends of the first mirror surface portion 12. One flange piece 32 of the first mirror surface portion 12 is connected to a lower end peripheral edge part of the bottom frame 20 of the cooking booth 18.

In this cooking booth 18, the projecting piece 24 bears a function of supporting a laying member 100 such as a baking rack (wire mesh) or a wire grating on which the targets to be heated W are placed and the bracket 32 bears a function as a mounting piece in incorporating this cooking booth 18, for example, into a table.

For example, two circular ring-shaped sheathed heaters 36 are arranged as electric heating elements at an inner side of the first mirror surface portion 12. These sheathed heaters 36 are arranged at a distance from a position right below the targets to be heated W, for example, as shown in FIGS. 3 to 9. In this case, the first mirror surface portion 12 includes two through holes (not shown) through which two terminals (not shown) of the sheathed heaters 36 are to be inserted, and the sheathed heaters 36 are held at the inner side of the first mirror surface portion 12 by a supporting bracket (not shown) arranged on an inner surface side of the first mirror surface portion 12 in a state where the two terminals (not shown) of the sheathed heaters 36 are inserted into these through holes (not shown). That is, the sheathed heaters 36 are so arranged as to be surrounded by the first mirror surface portion 12.

Particularly, for example, as shown in FIG. 1, the sheathed heaters 36 are arranged to be surrounded at the inner side of the first mirror surface portion 12 so as to be located near the one focuses Fa to Fe of the first to fifth partial elliptical mirror surface portions a to e of the first mirror surface portion 12. In the first mirror surface portion 12, the first to fifth partial elliptical mirror surface portions a to e are so arranged that the other focuses Fa to Fe thereof are located below the sheathed heaters 36.

It should be noted that, besides the sheathed heaters 36, a ceramic heater such as a silicon carbide heater which radiates much far-infrared rays may be used as an electric heating element. In this case, the sheathed heaters 36 are used for low power and the ceramic heater is used for high power. Further, far-infrared heaters or the like can also be appropriately used as electric heating elements.

Furthermore, although the electric heating elements such as the sheathed heaters 36 are formed to have a circular ring shape in this embodiment, there is not limitation thereto and the electric heating elements may be formed to have, for example, a rectangular annular shape, a square annular shape, a triangular annular shape or the like in a plan view and may be so arranged at the inner side of the first mirror surface portion 12 as to be surrounded by the first mirror surface portion 12.

The second mirror surface portion 14 in the form of a quadric surface of revolution is arranged below the first mirror surface portion 12. Particularly as shown in FIG. 1, the second mirror surface portion 14 includes, for example, one partial elliptical mirror surface portion s. This partial elliptical mirror surface portion s is formed as a partial surface of a rotational elliptical surface S having one focus Fs and the other focus Fs. This partial elliptical mirror surface portion s is arranged to have the one focus Fs near the sheathed heaters 36 and the other focus Fs below the sheathed heaters 36. The "rotational elliptical surface" described above means a surface of a rotational ellipsoid.

In this case, the one focus Fs of the above partial elliptical mirror surface portion s is arranged at the same position as the one focuses Fa to Fe of the first to fifth partial elliptical mirror surface portion a to e of the first mirror surface portion 12 as shown in FIG. 1. That is, the one focus Fs of this partial elliptical mirror surface portion s shares one focus with the one focuses Fa to Fe of the first to fifth partial elliptical mirror surface portions a to e. Further, this partial elliptical mirror surface portion s is so configured that the other focus Fs thereof is located below the first and second mirror surface portions 12, 14.

This partial elliptical mirror surface portion s forming the second mirror surface portion 14 is, for example, formed by bending a single metal plate of stainless steel, silver or the like through metal working and mirror finishing is applied at least to a surface, which becomes the inner peripheral surface of this partial elliptical mirror surface portion s, to form a mirror surface.

Further, a flange piece 38 projecting outward and in the form of a circular ring in a plan view is formed on an upper end peripheral edge part of the second mirror surface portion 14. This second mirror surface portion 14 and the first mirror surface portion 12 are set by removably connecting the flange piece 38 of this second mirror surface portion 14 and the other flange piece 34 of the first mirror surface portion 12 by an appropriate connection method (e.g. bolt and nut, connection pin, screw, convexo-concave coupling, or other connection means).

It should be noted that the second mirror surface portion 14 includes a discharge opening 40, which is, for example, circular in a plan view, on a bottom part thereof as shown in FIGS. 1 and 2. This discharge opening 40 bears a function of discharging contaminants such as meat juice, oil and moisture produced in cooking the targets to be heated W such as meat, fish, vegetable or bread with the electric stove 10 or drainage and the like in cleaning the first mirror surface portion 12, the second mirror surface portion 14, the cooking booth 18 and the like.

In the electric stove 10 according to this embodiment, the laying member 100 such as a baking rack (wire mesh) or a wire grating is placed on the upper surface of the projecting piece 24 of the cooking booth 18 as shown in FIGS. 3 to 9. For example, targets to be cooked such as meat, fish, vegetable or bread are placed as the targets to be heated W on the laying member 100.

Since the electric stove 10 according to this embodiment has the above configuration, heat rays radiated from the sheathed heaters 36 are reflected by the first mirror surface portion 12 as shown in FIGS. 3 to 9. The heat rays reflected by the first mirror surface portion 12 are reflected immediately upwardly in a substantially vertical direction and collected to a side below the targets to be heated W by the action of the second mirror surface portion 14. Thus, the targets to be heated W can be heated. Since the first and second mirror surface portions 12, 14 respectively have the first to fifth partial elliptical mirror surface portions a to e of the first mirror surface portion 12 and the partial elliptical mirror surface portion s of the second mirror surface portion 14 each having one focus near the sheathed heaters 36 in this electric stove 10, the heat rays can be so reflected as not to diffuse by these first to fifth partial elliptical mirror surface portions a to e and partial elliptical mirror surface portion s. In this case, the first to fifth partial elliptical mirror surface portions a to e included in the first mirror surface portion 12 can reflect the heat rays radiated from the sheathed heaters 36 to the partial elliptical mirror surface portion s of the second mirror surface portion 14 in such a manner as not to diffuse the heat rays and the partial elliptical mirror surface portion s of this second mirror surface portion 14 can reflect the heat rays reflected by the first mirror surface portion 12 immediately upwardly in such a manner as not to diffuse the heat rays.

Thus, in this electric stove 10, heat rays with low reflection efficiency can be reduced, for example, as compared with the conventional electric stove 1 shown in FIGS. 21 to 25. Specifically, in this electric stove 10, the reflection efficiency of heat rays on the first and second mirror surface portions 12, 14 becomes higher, whereby a loss in terms of thermal efficiency can be further reduced and these heat rays can be effectively irradiated to the side below the targets to be heated W.

Accordingly, in this electric stove 10, the heat rays radiated form the sheathed heaters 36 can be quite efficiently collected to the side below the targets to be heated W with a small number of reflections such as one or two by the cooperative action of the first and second mirror surface portions 12, 14 as compared with the conventional electric stove 1 shown in FIGS. 21 to 25. In this case, the heat rays radiated from the sheathed heaters 36 in this electric stove 10 are hardly accumulated in an inner side enclosed by the first and second mirror surface portions 12, 14 and hardly escape to a side (outer peripheral surface side) of the electric stove 10 as shown in FIGS. 3 to 9. Thus, a wide heating range where the targets to be heated W are heated can be ensured and the heating range can be uniformly and evenly heated in its peripheral edge part as well as its central part.

Specifically, since the heat rays from the sheathed heaters 36 are uniformly irradiated to the entire laying member 100 in this electric stove 10, problems such as nonuniform grilling of the targets to be heated W placed on the laying member 100 and concerns such as the hot outer peripheral surface of this electric stove 10 due to the heat rays that escaped to the side (outer peripheral side) of the electric stove 10 are removed.

Further, since the sheathed heaters 36 are arranged at a distance from the position right below the targets to be heated W in this electric stove 10, there is hardly any possibility that contaminants such as meat juice and oil adhere to the sheathed heaters 36 when the targets to be heated W are food such as fish or meat. Thus, the production of smoke caused by the burning of contaminants adhering to the sheathed heaters 36 can be maximally suppressed. In this case, a factor to reduce reflection efficiency due to the burning of contaminants adhering to the sheathed heaters 36 can also be removed.

It should be noted that if silicon carbide heaters, for example, are used in place of the sheathed heaters 26, food being cooked can be heated up to its interior and the food can be cooked with the surface appropriately charred while moisture inside is kept since the heat rays include much far-infrared rays.

In FIGS. 3 to 9, a reflected state of the heat rays radiated from the sheathed heaters 36 is shown, mainly centered on one sides of the mirror surface portion 12 and the second mirror surface portion 14 on the right side of a center axis x-x of the electric stove 10. However, this is simply to make the state easily seeable for the sake of convenience and, actually, a reflected state of the heat rays is similarly present at the other sides of the mirror surface portion 12 and the second mirror surface portion 14 shown on the left side of the center axis x-x of the electric stove 10 in FIGS. 3 to 9.

Second Embodiment

FIG. 10 is a schematic front view in section showing another example of the embodiment of the present invention, and FIG. 11 is a schematic plan view of the embodiment shown in FIG. 10. Further, FIGS. 12 to 20 are explanatory diagrams showing reflection paths of heat rays radiated from electric heating elements when targets to be heated were heated using an electric stove according to the embodiment shown in FIGS. 10 and 11.

An electric stove 10 according to this embodiment (second embodiment) differs from the embodiment (first embodiment) described above with reference to FIGS. 1 to 9 particularly in the configuration of the first mirror surface portion 12. In this case, in the embodiment (first embodiment) shown in FIGS. 1 to 9, the first mirror surface portion 12 is formed, for example, by the five partial elliptical mirror surface portions (first to fifth partial elliptical mirror surface portions a to e) and the other focuses Fa to Fe of these first to fifth partial elliptical mirror surface portions a to e are configured so as to be located below the sheathed heaters 36. Contrary to that, in this embodiment (second embodiment) shown in FIGS. 10 to 20, a first mirror surface portion 12 is formed by, for example, two linear mirror surface portions and, for example, five partial elliptical mirror surface portions, and some of the other focuses of these five partial elliptical mirror surface portions are located below sheathed heaters 36 and the others are located above the sheathed heaters 36.

Specifically, the first mirror surface portion 12 of this embodiment (second embodiment) particularly includes, for example, a first linear mirror surface portion f and a second linear mirror surface portion g, which are linear and arranged on peripheral edge sides of one and the other ends, respectively, particularly as shown in FIG. 10. For example, five partial elliptical mirror surface portions, of a first partial elliptical mirror surface portion α, a second partial elliptical mirror surface portion β, a third partial elliptical mirror surface portion γ, a fourth partial elliptical mirror surface portion δ and a fifth partial elliptical mirror surface portion ε are arranged in this order between the first and second linear mirror surface portions f and g.

In this case, the first partial elliptical mirror surface portion α is formed as a partial surface of a rotational elliptical surface A having one focus Fα and the other focus Fα. Similarly, the second partial elliptical mirror surface portion β is formed as a partial surface of a rotational elliptical surface B having one focus Fβ and the other focus Fβ, the third partial elliptical mirror surface portion γ is formed as a partial surface of a rotational elliptical surface Γ having one focus Fγ and the other focus Fγ, the fourth partial elliptical mirror surface portion δ is formed as a partial surface of a rotational elliptical surface Δ having one focus Fδ and the other focus Fδ and the fifth partial elliptical mirror surface portion ε is formed as a partial surface of a rotational elliptical surface E having one focus Fε and the other focus Fε. It should be noted that the "rotational elliptical surface" described above means a surface of a rotational ellipsoid.

In this embodiment (second embodiment), the one focuses Fα to Fε of the first to fifth partial elliptical mirror surface portions α to ε are arranged at the same position. That is, the one focuses Fα to Fε of the first to fifth partial elliptical mirror surface portions α to ε share one focus. Further, the first, fourth and fifth partial elliptical mirror surface portions α, δ, ε are so formed that the other focuses Fα, Fδ and Fε thereof are respectively located below the first mirror surface portion 12 and sheathed heaters 36. Furthermore, the second and third partial elliptical mirror surface portions β, γ are so formed that the other focuses Fβ, Fγ thereof are located above the sheathed heaters 36.

Further, the second mirror surface portion 14 includes the partial elliptical mirror surface portion s in the embodiment (first embodiment) shown in FIGS. 1 to 9, whereas this embodiment (second embodiment) shown in FIGS. 10 to 20 differs in that the second mirror surface portion 14 includes a conical mirror surface portion i particularly as shown in FIG. 10.

It should be noted that, in this embodiment (second embodiment), flange pieces 42, 44 projecting outward are respectively provided on peripheral edge parts of one and the other ends of the first mirror surface portion 12 and a flange piece 46 projecting outward and in the form of a circular ring in a plan view is formed on an upper end peripheral edge part of the second mirror surface portion 14. This flange piece 46 of the second mirror surface portion 14 is formed to have a projecting length substantially equal to that of the other flange piece 44 of the first mirror surface portion 12. This second mirror surface portion 14 and the first mirror surface portion 12 are set by removably connecting the flange piece 46 of this second mirror surface portion 14 and the other flange piece 44 of the first mirror surface portion 12 by an appropriate connection method (e.g. bolt and nut, connection pin, screw, convexo-concave coupling, or other connection means).

Since the embodiment (second embodiment) shown in FIGS. 10 to 20 has the aforementioned configuration, the heat rays radiated from the sheathed heaters 36 can be so reflected to the second mirror surface portion 14 as not to diffuse by these first to fifth partial elliptical mirror surface portions α to ε as shown in FIGS. 12 to 20, for example, as compared with the conventional electric stove 1 shown in FIGS. 21 to 25. Further, the second mirror surface portion 14 including the conical mirror surface portion i can reflect the heat rays reflected by the first mirror surface portion 12 immediately upwardly in a substantially vertical direction with a small number of reflections such as one or two.

In FIGS. 12 to 20, a reflected state of the heat rays radiated from the sheathed heaters 36 is shown, mainly centered on one sides of the mirror surface portion 12 and the second mirror surface portion 14 on the right side of a center axis x-x of the electric stove 10. However, this is simply to make the state easily seeable for the sake of convenience and, actually, a reflected state of the heat rays is similarly present at the other sides of the mirror surface portion 12 and the second mirror surface portion 14 shown on the left side of the center axis x-x of the electric stove 10 in FIGS. 12 to 20.

In this case, since the second mirror surface portion 14 includes the conical mirror surface portion i in this embodiment (second embodiment), the heat rays are diffused by this second mirror surface portion 14 and the reflection efficiency of the heat rays on the second mirror surface portion 14 is reduced as compared with the case where the second mirror surface portion 14 includes partial elliptical mirror surface portions (first to fifth partial elliptical mirror surface portions a to e) as in the embodiment (first embodiment) shown in FIGS. 1 to 9. However, heat rays with low reflection efficiency can be reduced, for example, as compared with the conventional electric stove 1 shown in FIGS. 21 to 25. Therefore, in this embodiment (second embodiment), heat rays can be effectively irradiated to a side below targets to be heated by reducing a loss in terms of thermal efficiency as compared with the conventional electric stove 1.

Specifically, although the electric stove 10 according to this embodiment (second embodiment) differs from the electric stove 10 according to the embodiment (first embodiment) shown in FIG. 9 in functions and effects due to the aforementioned differences, it is an electric stove further improved to be able to further increase reflection efficiency and reduce a loss in terms of thermal efficiency by maximally preventing the diffusion of heat rays radiated from the sheathed heaters 36 on the first mirror surface portion 12 and collecting the heat rays to the side below the targets to be heated W by reflecting the heat rays immediately upwardly with one, two or a small number of reflection on the second mirror surface portion 14, for example, as compared with the conventional electric stove 1 shown in FIGS. 21 to 25.

It should be noted that, in the electric stoves according to the above first and second embodiments, the first mirror surface portion 12 may include a partial elliptical rotational surface portion having one focus near the sheathed heaters 36 and the other focus near the sheathed heaters 36 facing with center points of the sheathed heaters 36 in a diametrical direction as a center axis.

Further, the first mirror surface portion 12 may include a partial elliptical rotational surface portion having one focus near the sheathed heaters 36 and the other focus near the sheathed heaters facing with center points of the sheathed heaters 36 in a diametrical direction as a center axis and a partial elliptical rotational surface portion having one focus near the sheathed heaters 36 and the other focus at least either below or above the sheathed heaters 36.

INDUSTRIAL APPLICABILITY

An electric stove according to the present invention is for heating a target to be heated by radiation heat and suitably used for cooking, for example, fish, meat, vegetable, bread and other foods.

The invention claimed is:
1. An electric stove, comprising:
an electric heating element arranged at a height below a height of a target to be heated;
a first mirror surface portion arranged to surround the electric heating element and configured to reflect heat rays radiated from the electric heating element, the first mirror surface having a first flange extending radially outward from a bottom end of the first mirror surface; and a second mirror surface portion in the form of a quadric surface of revolution arranged below the electric heating element and configured to collect the heat rays reflected by the first mirror surface portion to the target by reflecting the heat rays to the target, the second mirror surface having a second flange extending radially outward from a top end of the second mirror surface, the second flange being parallel to the first flange and connectable to the first flange, wherein:
the first mirror surface portion includes a partial elliptical mirror surface portion having one focus near the electric heating element and the other focus below the electric heating element, the partial elliptical mirror surface portion configured to reflect the heat rays radiated from the electric heating element,
the second mirror surface portion includes a partial elliptical mirror surface portion, defined by a segment of an ellipse having a first focus and a second focus, the first focus near the electric heating element and the second focus below the electric heating element, and
the first flange is located radially inward from the second flange.

2. An electric stove according to claim 1, wherein the first mirror surface portion includes at least three partial elliptical mirror surface portions each having one focus near the electric heating element and the other focus below the electric heating element.

3. An electric stove, comprising:
an electric heating element arranged at a at a height below a height of a target to be heated;
a first mirror surface portion arranged to surround the electric heating element and configured to reflect heat rays radiated from the electric heating element, the first mirror surface including a first flange extending radially outward from a bottom end of the first mirror surface; and
a second mirror surface portion in the form of a quadric surface of revolution arranged below the electric heating element and configured to collect the heat rays reflected by the first mirror surface portion to the target by reflecting the heat rays to the target, the second mirror surface including a second flange extending radially outward from a top end of the second mirror surface and connectable with the first flange;

wherein:
the first mirror surface portion includes at least three partial elliptical mirror surface portions having one focus near the electric heating element and the other focus below the electric heating element and configured to reflect the heat rays radiated from the electric heating element,
the first mirror surface portion further comprises at least two different partial elliptical mirror surface portion having one focus near the electric heating element and the other focus above the electric heating element, the another partial elliptical mirror surface portion configured to reflect the heat rays radiated from the electric heating element,
the second mirror surface includes a discharge opening at a bottom end of the second mirror surface opposite the top end, and
the second mirror surface portion has a conical shape, such that a cross-section of the second mirror surface portion includes two straight lines arranged symmetrically about a center axis passing through a center of the discharge opening, the two straight lines extending from the second flange to opposite sides of the discharge opening.

4. The electric stove of claim 1, further comprising:

a projection including a frame to which the first mirror surface portion is mounted, the first mirror surface portion being mounted to an underside of the frame, wherein an upper surface of the projection opposite the first mirror surface includes a resting surface for supporting a laying member on which the target to be heated is rested, and the upper surface of the projection further includes a hopper portion extending diagonally upward and outward from an innermost portion of the frame to the resting surface.

5. An electric stove, comprising:

an electric heating element arranged at a height below a height of a target to be heated;

a first mirror surface portion arranged to surround the electric heating element and configured to reflect heat rays radiated from the electric heating element, the first mirror surface having a first flange extending radially outward from a bottom end of the first mirror surface; and a second mirror surface portion in the form of a quadric surface of revolution arranged below the electric heating element and configured to collect the heat rays reflected by the first mirror surface portion to the target, the second mirror surface having a second flange extending radially outward from a top end of the second mirror surface, the second flange being parallel to the first flange and connectable to the first flange, wherein the second mirror surface portion includes a discharge opening at a bottom end of the second mirror surface opposite the top end, and the second mirror surface portion includes a partial elliptical mirror surface portion having one focus near the electric heating element and the other focus below the electric heating element, such that a cross-section of the second mirror surface portion includes first and second continuously curved lines defined by first and second segments of first and second ellipses, respectively, the first and second continuously curved lines extending between the second flange and opposite sides of the discharge opening.

* * * * *